(12) United States Patent
Lin et al.

(10) Patent No.: US 10,001,889 B2
(45) Date of Patent: Jun. 19, 2018

(54) MESH ELECTRODE, SENSING DEVICE, AND ELECTRODE LAYER

(71) Applicant: Industrial Technology Research Institute, Hsinchu (TW)

(72) Inventors: Heng-Tien Lin, Hsinchu County (TW); Chun-Ting Liu, Hsinchu County, TN (US); Shu-Yi Chang, Kaohsiung (TW); Su-Tsai Lu, Hsinchu (TW); Kuo-Hua Tseng, New Taipei (TW); Sheng-Feng Chung, Hsinchu (TW); Chen-Kun Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 222 days.

(21) Appl. No.: 14/927,496

(22) Filed: Oct. 30, 2015

(65) Prior Publication Data

US 2016/0132153 A1 May 12, 2016

Related U.S. Application Data

(60) Provisional application No. 62/085,339, filed on Nov. 28, 2014, provisional application No. 62/077,304, filed on Nov. 9, 2014.

(30) Foreign Application Priority Data

Jun. 26, 2015 (TW) .............................. 104120761 A

(51) Int. Cl.
  *G06F 3/045* (2006.01)
  *G06F 3/044* (2006.01)
(52) U.S. Cl.
  CPC .... *G06F 3/044* (2013.01); *G06F 2203/04112* (2013.01)

(58) Field of Classification Search
  CPC .......... G06F 3/044; G06F 3/041; G06F 3/045; G06F 3/046; G06F 3/047; G06F 2203/04112
  (Continued)

(56) References Cited

U.S. PATENT DOCUMENTS

2013/0141356 A1* 6/2013 Shih ...................... G06F 3/0412
                                                   345/173
2014/0292714 A1   10/2014 Lee et al.
(Continued)

FOREIGN PATENT DOCUMENTS

TW    201323915    6/2013
TW    201431034    8/2014

OTHER PUBLICATIONS

"Office Action of Taiwan Counterpart Application", dated Jun. 2, 2016, p. 1-p. 6.

*Primary Examiner* — Rodney Amadiz
(74) *Attorney, Agent, or Firm* — JCIPRNET

(57) ABSTRACT

A mesh electrode, a sensing device and an electrode layer are provided, in which the sensing device includes the mesh electrode. The mesh electrode is formed by a plurality of grid lines intersecting and connected to each other. The grid line has a bottom surface and a cross-section, and the cross-section is perpendicular to the bottom surface and has at least one curved portion. The electrode layer includes a plurality of conducting lines. The conducting lines have at least three line widths or at least three spaces. An appearing probability of each line width may be identical in the electrode layer. An appearing probability of each space may be identical in the electrode layer. The conducting line has a bottom surface and a cross-section, and the cross-section is perpendicular to the bottom surface and has at least one curved portion.

14 Claims, 20 Drawing Sheets

(58) Field of Classification Search
USPC .................. 345/173–174; 178/18.05–18.07
See application file for complete search history.

(56) References Cited

U.S. PATENT DOCUMENTS

2015/0049260 A1* 2/2015 Yashiro .................. G06F 3/044
                                                              349/12
2015/0153873 A1* 6/2015 Lee ........................ G06F 3/044
                                                             345/174

* cited by examiner

MESH ELECTRODE, SENSING DEVICE, AND ELECTRODE LAYER

CROSS-REFERENCE TO RELATED APPLICATION

This application claims the priority benefits of U.S. provisional application Ser. No. 62/085,339, filed on Nov. 28, 2014, U.S. provisional application Ser. No. 62/077,304, filed on Nov. 9, 2014 and Taiwan application serial No. 104120761, filed on Jun. 26, 2015. The entirety of each of the above-mentioned patent applications is hereby incorporated by reference herein and made a part of specification.

TECHNICAL FIELD

The disclosure is related to a mesh electrode, an electrode layer and a sensing device.

BACKGROUND

The development of displays may focus on a more user-friendly interface between human and machine. With the emergence of flat-panel displays, touch panels have become the main stream and replaced input devices such as keyboards and mice, a variety of information equipments become easier to use. An era of easily-operated touch panels is coming, and the touch panels may be widely applied in car touch panels (for car navigation), game machines, public information systems (e.g., vending machines, automatic teller machines (ATMs), and guide systems), industrial purposes, small electronic products (e.g., personal digital assistants (PDAs)), e-books, etc.

As demands for smartphones are dramatically increased, for example, a projective capacitive touch sensing device appears to have an explosive development, more and more touch manufacturers get involved in the development and production of multi-touch technologies.

SUMMARY

According to an embodiment of the disclosure, a mesh electrode may include a cross-section having at least one curved portion.

According to another embodiment of the disclosure, a sensing device may include a mesh electrode.

According to yet another embodiment of the disclosure, an electrode layer may include a cross-section having at least one curved portion.

A mesh electrode provided by an embodiment of the disclosure is formed by a plurality of grid lines intersecting and connected with each other. The grid line has a bottom surface and a cross-section, and the cross-section is perpendicular to the bottom surface and has at least one curved portion.

A sensing device provided by an embodiment of the disclosure includes a first substrate and a first sensing layer. The first sensing layer is disposed on the first substrate and includes a plurality of first mesh units formed by a plurality of grid lines intersecting and connected with each other. The grid line has a bottom surface and a cross-section, and the cross-section is perpendicular to the bottom surface and has at least one curved portion.

An electrode layer provided by an embodiment of the disclosure includes a plurality of conducting lines. The conducting lines have at least three line widths or at least three spaces. An appearing probability of each line width is substantially the same in the electrode layer. An appearing probability of each line space is substantially the same in the electrode layer. The conducting line has a bottom surface and a cross-section, and the cross-section is perpendicular to the bottom surface and has at least one curved portion.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
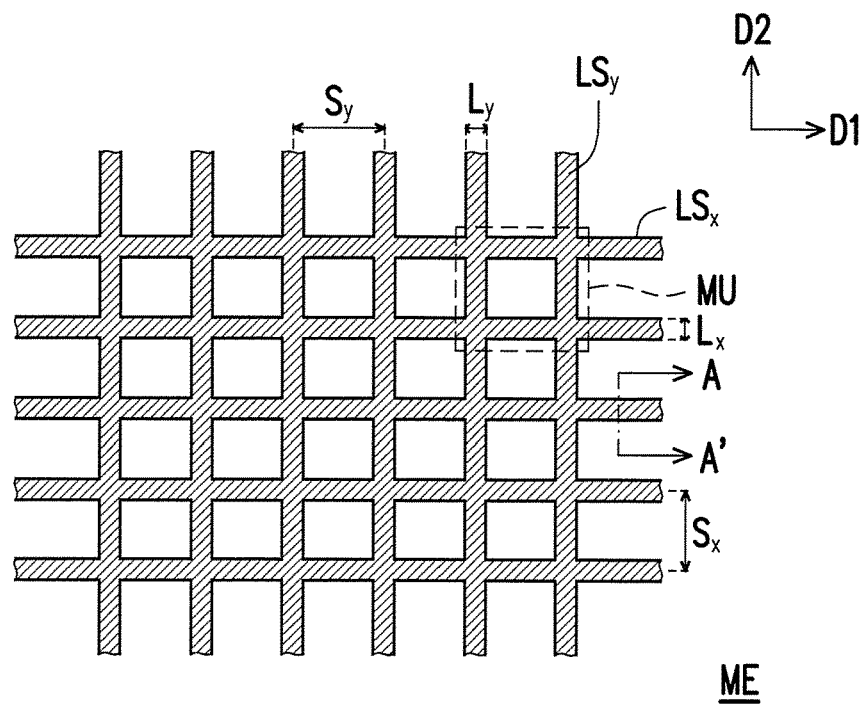
FIG. 1A is a partially schematic diagram illustrating a mesh electrode according to an embodiment of the disclosure.

In the following detailed description, for purposes of explanation, numerous details are set forth in order to provide a thorough understanding of the disclosed embodiments. It will be clear that one or more embodiments may be practiced without these details. In other instances, well-known structures and devices are schematically shown in order to simplify the drawing.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, components/devices/steps with the same reference numerals represent the same or similar parts. Components/devices/steps with the same reference numerals or names in different embodiments may be cross-referenced.

Figure 1B:
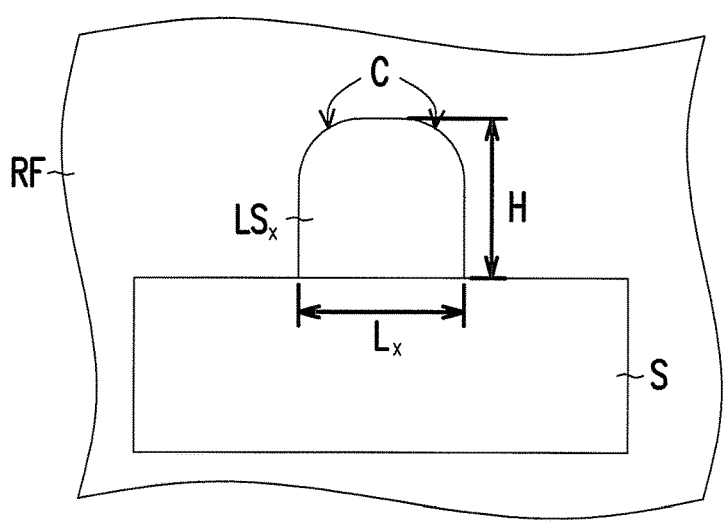
FIG. 1B through FIG. 1D are schematic diagrams respectively illustrating three cross-sections along the cross-section line A-A' in FIG. 1A.
Figure 1C:
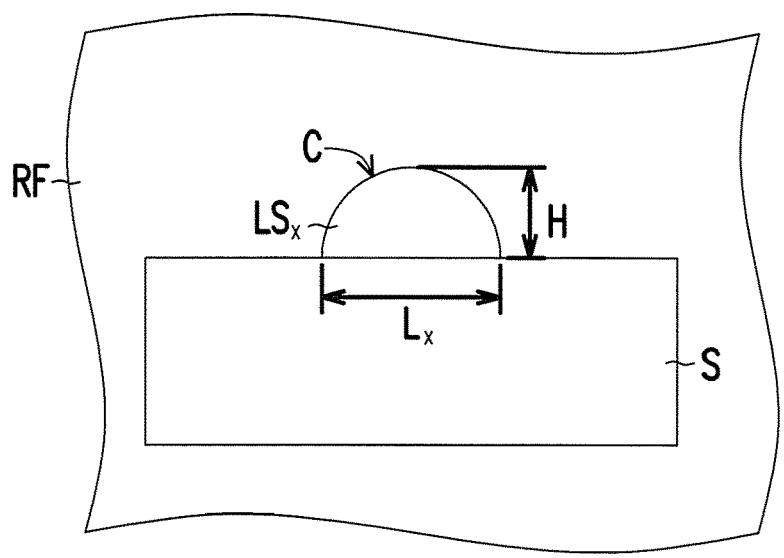
Figure 1D:
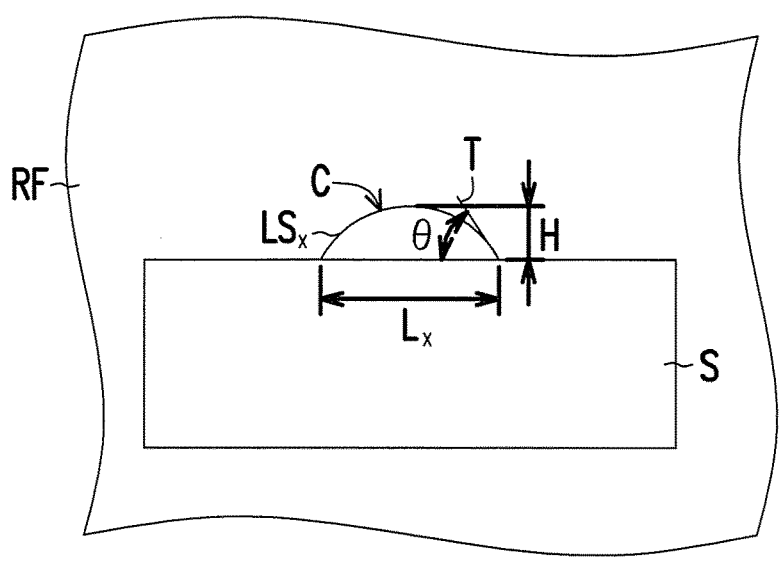

FIG. 1A is a partially schematic diagram illustrating a mesh electrode according to an embodiment of the disclosure, and FIG. 1B through FIG. 1D are schematic diagrams respectively illustrating three cross-sections along the cross-section line A-A' in FIG. 1A. With reference to FIG. 1A through FIG. 1D, a mesh electrode ME is formed by a plurality of grid lines $LS_x$ and $LS_y$ which intersect with each other and are connected with each other. In the present embodiment, the grid line $LS_x$ extends along a first direction D1, for example, and the grid line $LS_y$ extends along a second direction D2, for example. A plurality of grid lines $LS_x$ and $LS_y$ may form a plurality of mesh units MU, and thus, the mesh electrode ME may include a plurality of mesh units MU. In the present embodiment, the mesh electrode ME is disposed on a substrate S, for example. The substrate S may be a rigid substrate or a flexible substrate. The rigid substrate includes a rigid glass substrate, a sapphire substrate, a transparent ceramic substrate or any other adaptive substrate. The flexible substrate includes a thin glass substrate or a flexible polymer substrate.

Referring to FIG. 1B through FIG. 1D, at least one of the grid lines $LS_x$ and $LS_y$ has a bottom surface and a cross-section, the cross-section is perpendicular to the bottom surface and has at least one curved portion C. The grid line $LS_x$ has a cross-section on a reference flat RF perpendicular to the substrate S. The cross-section has least one curved portion C. A shape of the curved portion C may be arcuate, and a slope of the curved portion C may be continuously changed. Additionally, according to different design requirements, process parameters or materials of the grid lines $LS_x$ and $LS_y$ may be adaptively modulated to change the number and a curvature radius of the curved portion C, or to change a shape and a thickness H of the cross-section. According to FIG. 1D, when a tangent T passes through a crossing point of the cross-section and the substrate S, an angle θ between the substrate S and the tangent T is an acute angle, and the angle θ is, for example, between 20 and 60 degrees. Even though the cross-sectional view of the grid line $LS_x$ is illustrated in the present embodiment for example, the grid line $LS_y$ may have the same cross-sectional view as the grid line $LS_x$ and thus, will not be repeatedly described.

In the present embodiment, a method for forming the mesh electrode ME is, for example, a printing process. Since at least one of the grid lines $LS_x$ and $LS_y$ may be formed by using the printing process, in the cross-section, a position where a top and a side connect has a lead angle, or the top has an R value, or an included angle between the side and a bottom is an acute angle. Additionally, in a cross-section of a conducting line formed by a lithography process, an included angle between the side and the bottom is a right angle or an obtuse angle due to over-etching. Further, under the same printing parameters (e.g., printing speed), the same ink material, the same curing parameters (e.g., curing temperature), the line width and line thickness of the conductive line are positively correlated. In other words, if a conductive line is wider, it is also thicker, and if a conductive line is narrower, it is also thinner. In an embodiment, the line width and the line thickness of the grid lines $LS_x$ and $LS_y$ may be positively correlated, for example.

The printing process has simple steps, low equipment cost and being capable of manufacturing in a large area and thus, is suitable for mass production. The aforementioned printing may include gravure off-set printing, ink-jet printing or nano-imprinting. A material of the mesh electrode ME may be a transparent conductive material or a metal conductive material. The transparent conductive material may include, for example, metal oxides, conductive/conjugate polymers, carbon nanotubes, graphene, silicene, metal nanowires such as silver nanowires, conductive inks or any other transparent conductive material. The metal oxides may include, for example, indium tin oxide (ITO), indium zinc oxide (IZO), aluminum tin oxide (ATO), aluminum zinc oxide (AZO), indium gallium zinc oxide (IGZO), fluorine-doped tin oxide (FTO) or other metal oxides. The conductive inks may include silver paste, copper paste or carbon paste, etc. The metal conductive material may include metal, complex metal compounds or the like. In the present embodiment, the mesh electrode ME has flexibility, for example, and a flexible radius R of the mesh electrode ME may be less than 100 mm, for example.

In the present embodiment, line widths $L_x$ and $L_y$ of the grid lines $LS_x$ and $LS_y$ are the same, and line spaces $S_x$ and $S_y$ thereof are the same, for example, but the disclosure is not limited thereto. For instance, referring to FIG. 2A through FIG. 2K, the conducting lines LS have at least three line widths or at least three spaces, for example, which will be described in detail below.

Figure 2A:
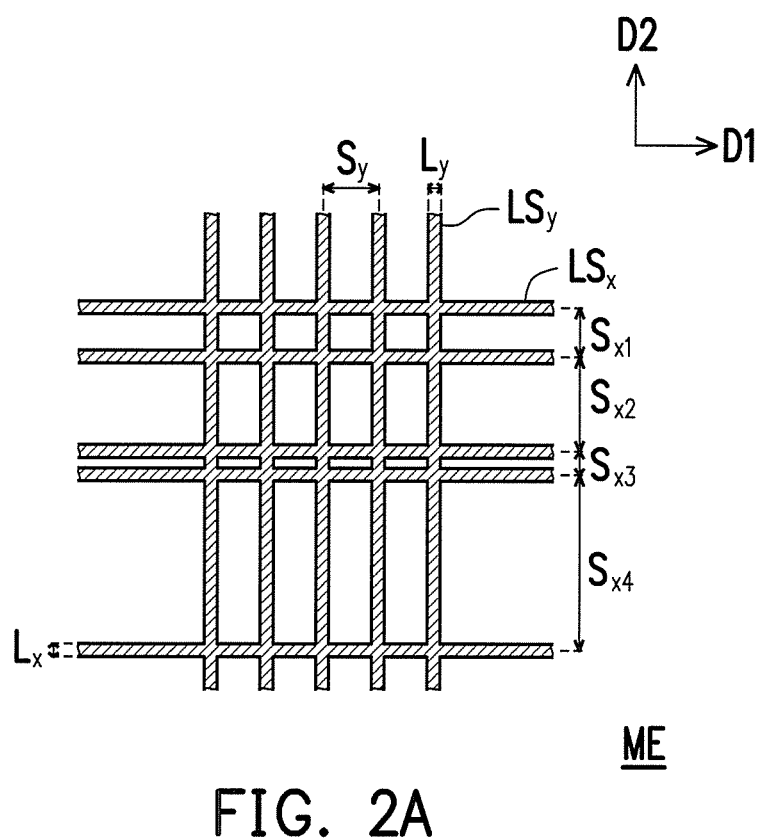
FIG. 2A through FIG. 2K are partially schematic diagrams respectively illustrating a mesh electrode according to an embodiment of the disclosure.
Figure 2B:
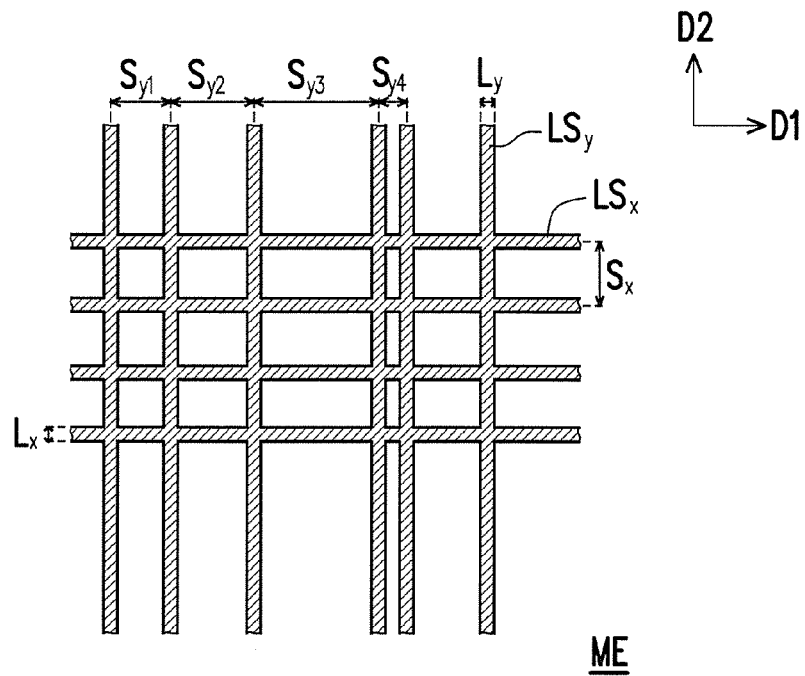
Figure 2C:
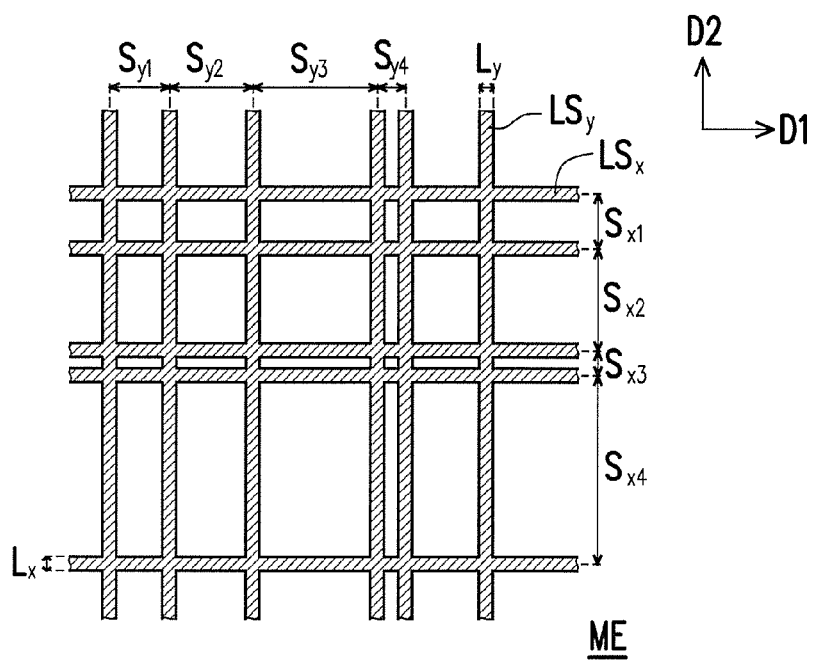
Figure 2D:
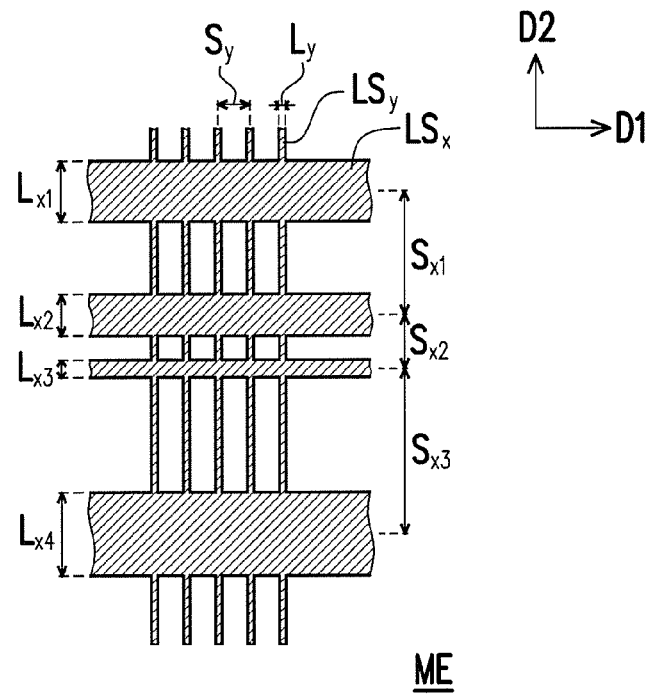
Figure 2E:
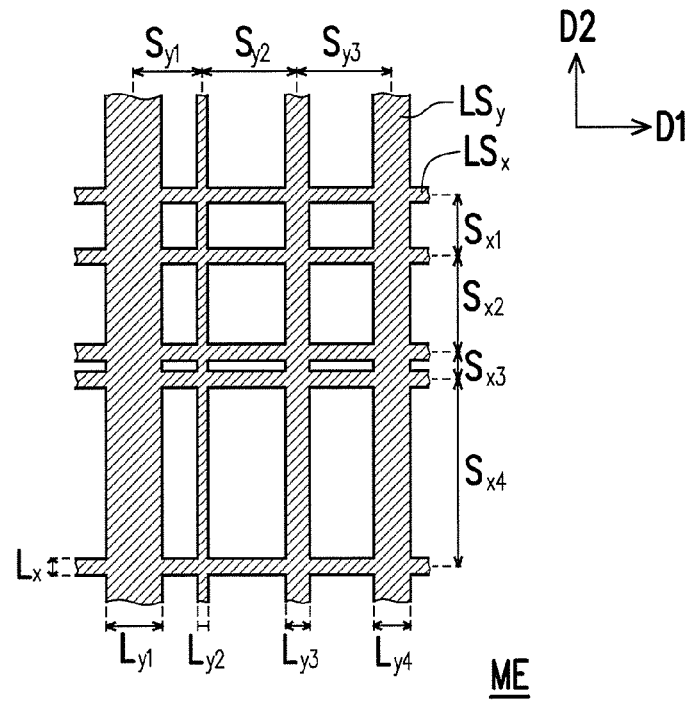
Figure 2F:
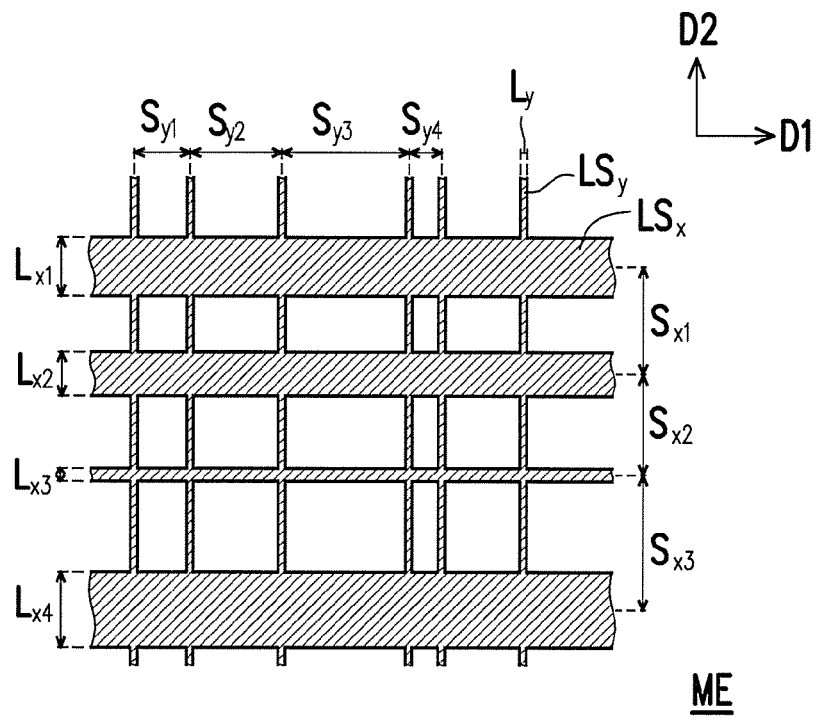
Figure 2G:
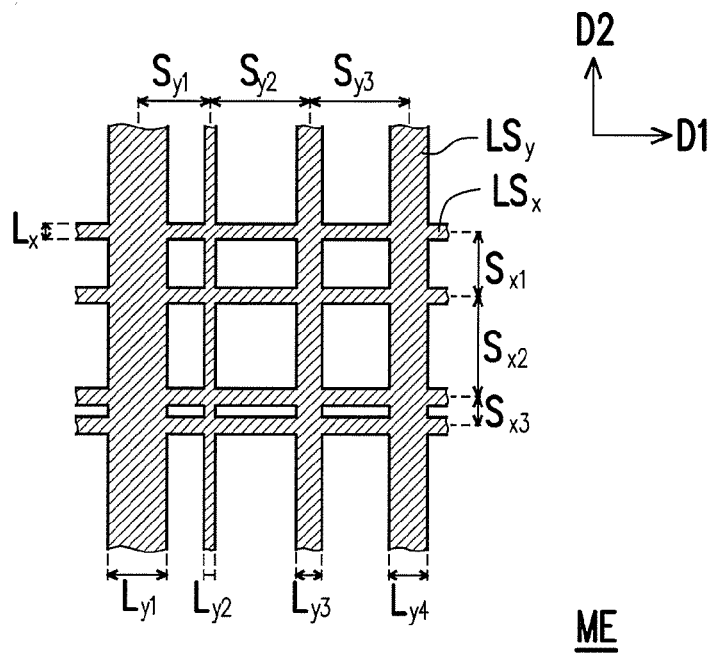
Figure 2H:
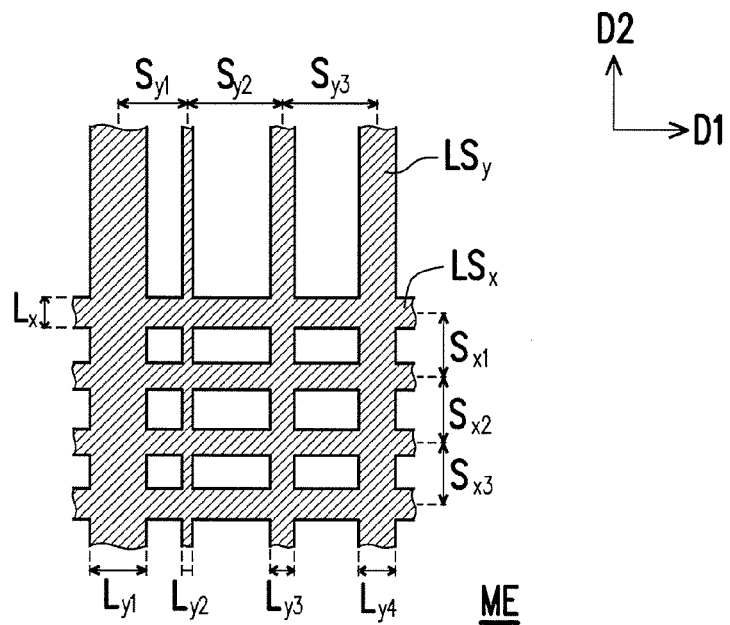
Figure 2I:
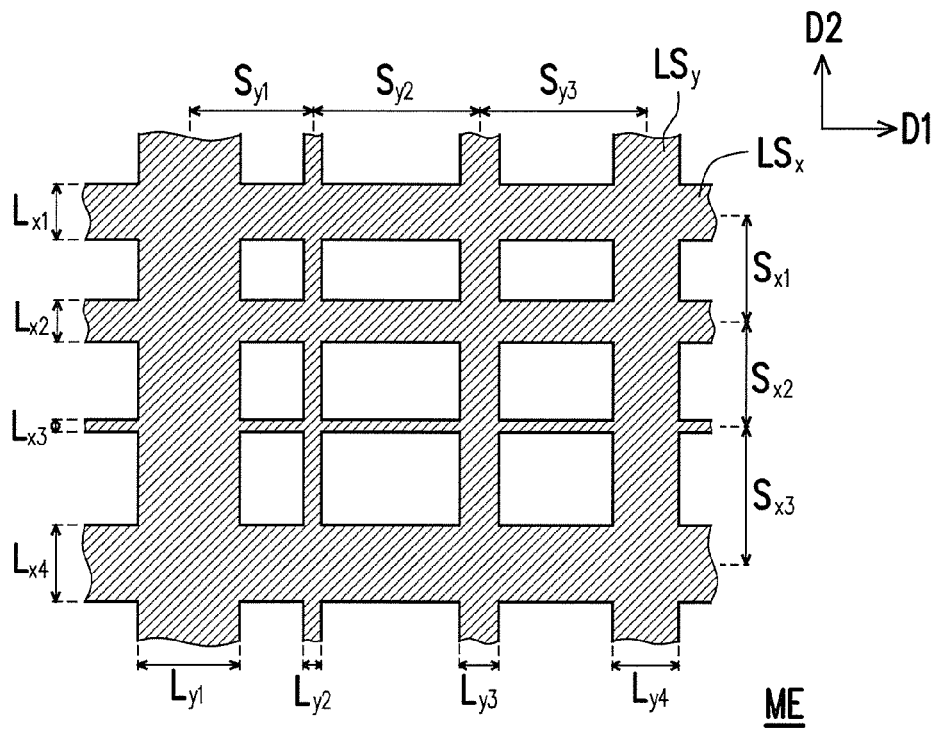
Figure 2J:
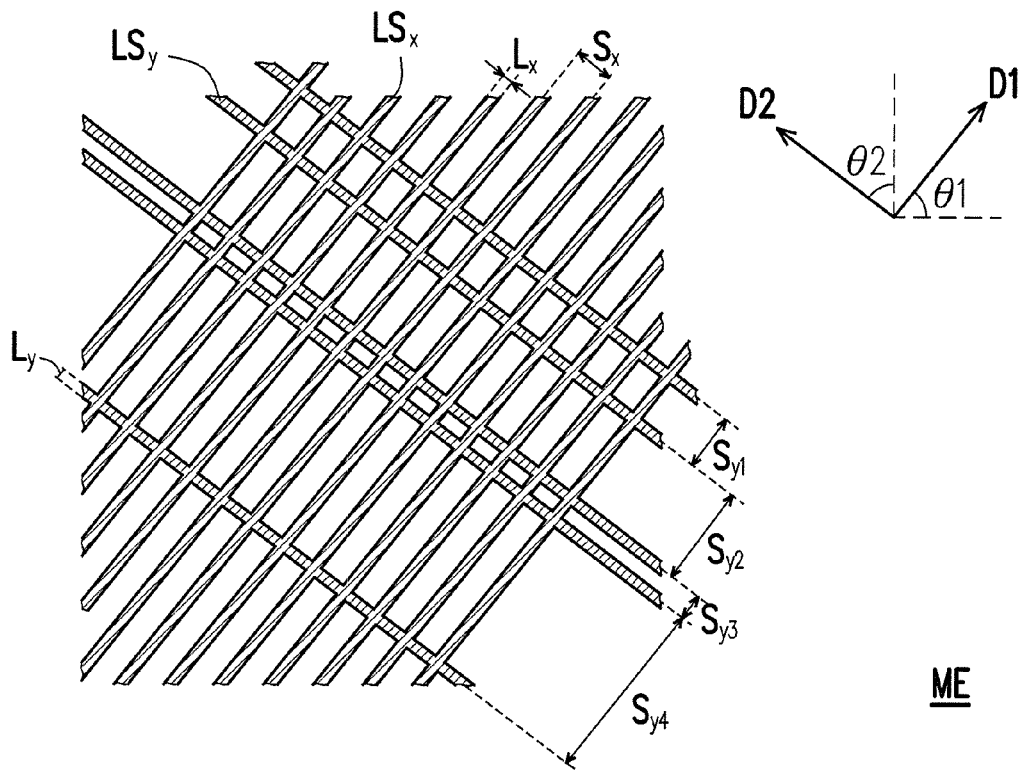
Figure 2K:
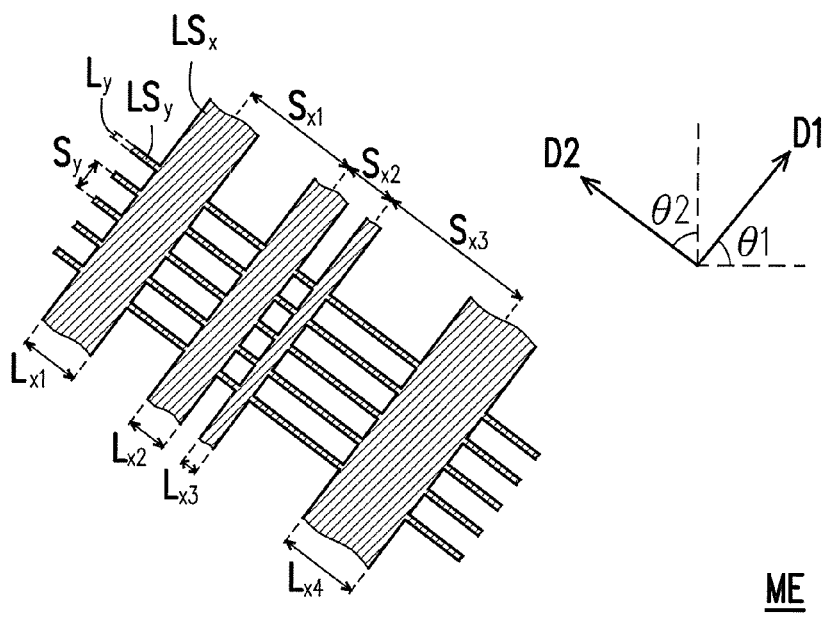

Referring to FIG. 2A, at least three line spaces $S_{x1}$, $S_{x2}$ and $S_{x3}$ are between each two grid lines $LS_x$, the line spaces $S_{x1}$, $S_{x2}$ and $S_{x3}$ are randomly distributed between each two grid lines $LS_x$, and each of the line spaces $S_{x1}$, $S_{x2}$ and $S_{x3}$ has a same appearing probability in the mesh electrode ME. The grid lines $LS_x$ extending along the first direction D1 have different line spaces $S_{x1}$, $S_{x2}$ and $S_{x3}$, and the line spaces $S_{x1}$, $S_{x2}$ and $S_{x3}$ may be randomly distributed among the grid lines $LS_x$. The line widths $L_x$ and $L_y$ of the grid lines $LS_x$ and $LS_y$ range from 3 to 30 µm. Ratios of the line width $L_x$ to the line space $S_{x1}$, $S_{x2}$ or $S_{x3}$ of the grid line $LS_x$ range from 1/200 to 1/2, for example. The line spaces $S_{x1}$, $S_{x2}$ and $S_{x3}$ of the grid lines $LS_x$ may be the same as or different from the line spaces $S_y$ of the grid lines $LS_y$. In the present embodiment, the line space $S_y$ between each two grid lines $LS_y$ is illustrated as being fixed for example, but the disclosure is not limited thereto. For instance, referring to FIG. 2B, the grid lines $LS_y$ extending along the second direction D2 may have different line spaces $S_{y1}$, $S_{y2}$ and $S_{y3}$ form one another, the line spaces $S_{y1}$, $S_{y2}$ and $S_{y3}$ may be randomly distributed among the grid lines $LS_y$, each of the line spaces $S_{y1}$, $S_{y2}$ and $S_{y3}$ may have the same appearing probability in the mesh electrode ME, and there is a fixed line space $S_x$ between the grid lines $LS_x$. Alternatively, referring to FIG. 2C, there are different line spaces $S_{x1}$, $S_{x2}$ and $S_{x3}$ between the grid lines $LS_x$ extending along the first direction D1, there are different line spaces $S_{y1}$, $S_{y2}$ and $S_{y3}$ between the grid lines $LS_y$ extending along the second direction D2, the line spaces $S_{x1}$, $S_{x2}$, $S_{x3}$, $S_{y1}$, $S_{y2}$ and $S_{y3}$ may be randomly distributed among the grid lines $LS_x$ and $LS_y$, and each of the line spaces $S_{x1}, S_{x2}, S_{x3}, S_{y1}, S_{y2}, S_{y3}$ has the same appearing probability in the mesh electrode ME, for example.

In the aforementioned embodiment, the grid lines $LS_x$ and $LS_y$ are illustrated as having the same line width for example, but the disclosure is not limited thereto. In an embodiment, referring to FIG. 2D through FIG. 2I, the grid lines $LS_x$ and $LS_y$ have at least three line widths $L_x, L_{x1}, L_{x2}, L_{x3}, L_{x4}, L_y, L_{y1}, L_{y2}, L_{y3}$ and $L_{y4}$, and the grid lines $LS_x$ and $LS_y$ with different line widths $L_x, L_{x1}, L_{x2}, L_{x3}, L_{x4}, L_y, L_{y1}, L_{y2}, L_{y3}$ and $L_{y4}$ may be randomly distributed in the mesh electrode ME and have, for example, the same appearing probability. Among them, the line widths $L_x, L_{x1}, L_{x2}$ and $L_{x3}$ of the grid lines $LS_x$ and the line widths $L_y, L_{y1}, L_{y2}$ and $L_{y3}$ of the grid lines $LS_y$ may be the same or different. The line widths $L_x, L_{x1}, L_{x2}, L_{x3}, L_{x4}, L_y, L_{y1}, L_{y2}, L_{y3}$ and $L_{y4}$ may range from 3 to 30 for example. Ratios of the line widths $L_x, L_{x1}, L_{x2}, L_{x3}, L_{x4}, L_y, L_{y1}, L_{y2}, L_{y3}$ and $L_{y4}$ of the grid lines $LS_x$ and $LS_y$ to the line spaces $S_x, S_{x1}, S_{x2}, S_{x3}, S_{x4}, S_y, S_{y1}, S_{y2}, S_{y3}$ and $S_{y4}$ may range from 1/200 to 1/2, for example. According to these embodiments, the line widths $L_x, L_{x1}, L_{x2}, L_{x3}$ and $L_{x4}$ and the line spaces $S_x, S_{x1}, S_{x2}, S_{x3}$ and $S_{x4}$ of the grid lines $LS_x$ may have various variations and combinations, while the line widths $L_y, L_{y1}, L_{y2}, L_{y3}$ and $L_{y4}$ and the line spaces $S_y, S_{y1}, S_{y2}, S_{y3}$ and $S_{y4}$ of the grid lines $LS_y$ may also have various variations and combinations.

In the preceding embodiments, the grid lines $LS_x$ are illustrated as extending along the x-axial direction, and the grid lines $LS_y$ are illustrated as extending the y-axial direction, but the disclosure is not limited thereto. In an embodiment, referring to FIG. 2J and FIG. 2K, the grid line $LS_x$ may have an angle $\theta1$ with the horizontal direction, and the grid line $LS_y$ may have an angle $\theta2$ with the vertical direction, where $0°<\theta1, \theta2<90°$, and $\theta1$ and the $\theta2$ may be the same or different. In addition, the grid lines $LS_x$ are illustrated as being perpendicular to the grid lines $LS_y$ for example in the embodiments above, but the disclosure is not limited thereto, and in other embodiments, a non-right angle or an arc angle (not shown) may be formed between the grid line $LS_x$ and the grid line $LS_y$. In other words, the grid patterns may not only be rectangular as illustrated in the drawings, but also be rhomboidal. Further, the mesh unit MU illustrated as a quadrilateral grid pattern formed by four grid lines $LS_x$ and four grid lines $LS_y$ in the embodiments above, but the disclosure is not limited thereto.

In the above embodiments, the mesh electrode ME has characteristics, such as high transmittance, low resistance and flexibility and thus, may be applied to devices, such as display devices, sensing devices, foldable devices and so on. Furthermore, according to different designs, the mesh electrode ME with different line widths, line thicknesses or resistance values may be manufactured by one printing process. Namely, the mesh electrode ME has a simple manufacturing method.

Hereinafter, embodiments that apply the mesh electrode in a sensing device will be described.

Figure 3A:
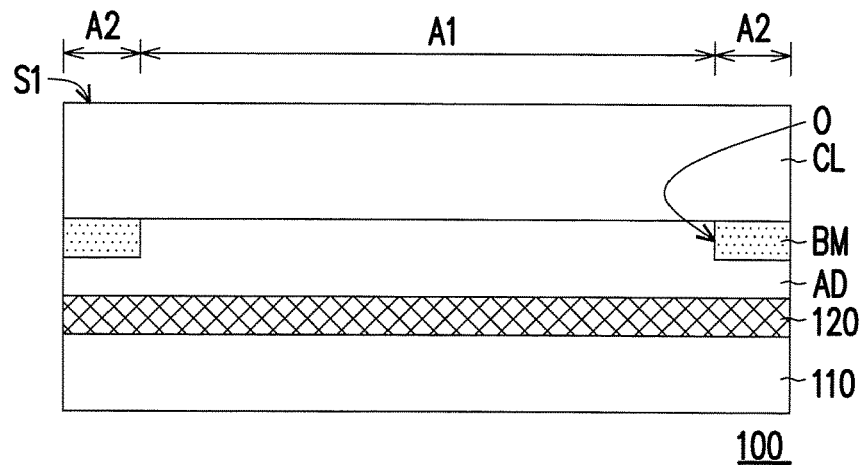
FIG. 3A is a schematic cross-sectional-view diagram illustrating a sensing device according to an embodiment of the disclosure.
Figure 3B:
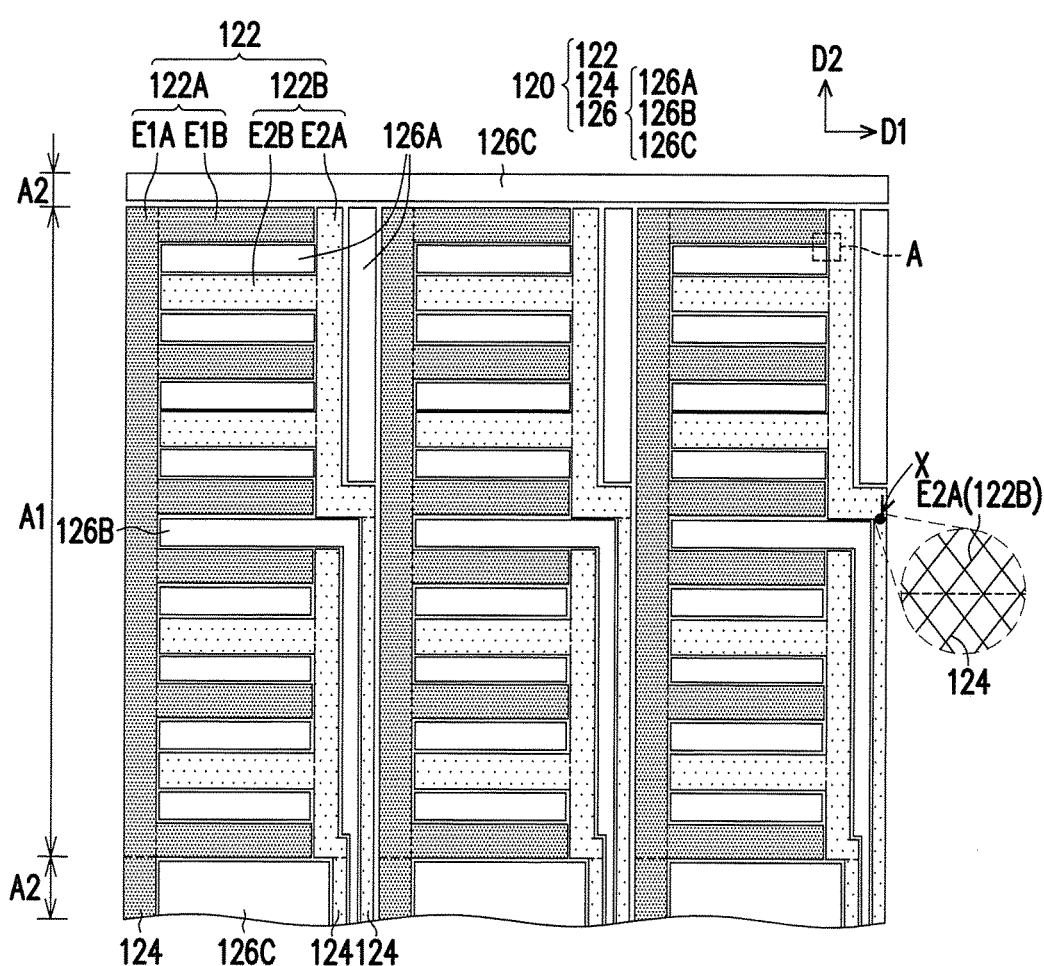
FIG. 3B is a partially schematic top-view diagram illustrating a sensing layer depicted in FIG. 3A.
Figure 3C:
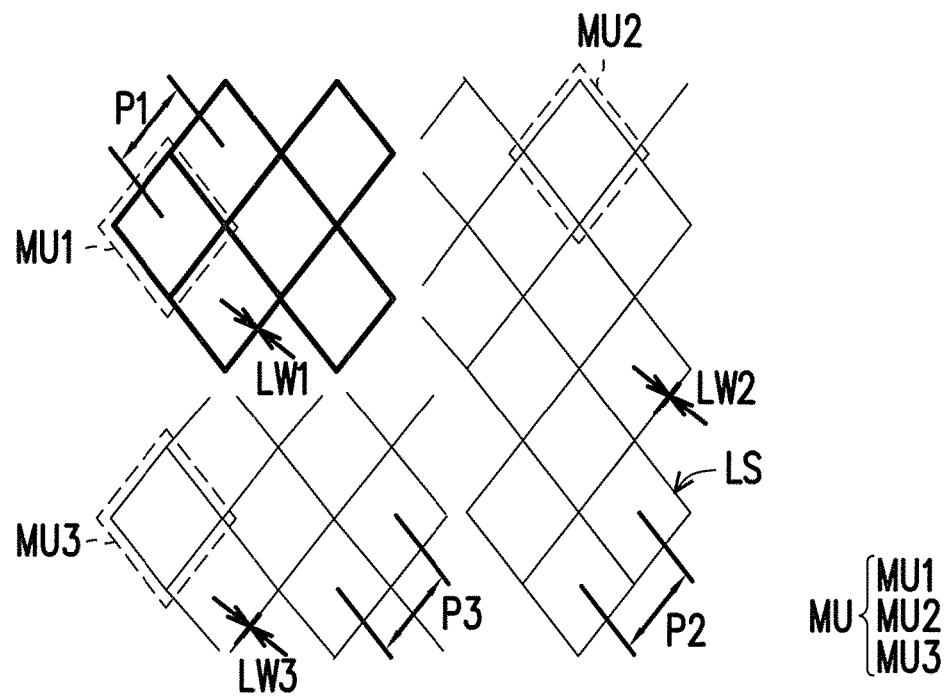
FIG. 3C is a schematic enlarged-view diagram illustrating the region A depicted on FIG. 3B.

FIG. 3A is a schematic cross-sectional-view diagram illustrating a sensing device according to an embodiment of the disclosure. FIG. 3B is a partially schematic top-view diagram illustrating a sensing layer depicted in FIG. 3A. FIG. 3C is a schematic enlarged-view diagram illustrating the region A depicted on FIG. 3B. With reference to FIG. 3A through FIG. 3C, a sensing device 100 includes a substrate 110 and a sensing layer 120.

The substrate 110 may be a device substrate in a display panel or a substrate disposed outside the display panel. The former may be, for example, an opposite substrate of a liquid crystal display (LCD) panel or a packaging cover of an organic light emitting display (OLED) panel. The latter may be, for example, a cover lens disposed outside and appended to a display panel, but the disclosure is not limited thereto.

For example, the substrate 110 may be a plastic substrate, a glass substrate, a sapphire substrate, a transparent ceramic substrate or any other suitable substrate. The glass substrate may be a rigid glass substrate or a flexible thin glass substrate.

The substrate 110 has an active region A1 and a peripheral region A2. The peripheral region A2 is disposed on at least one side of the active region A1, and for example, the peripheral region A2 is located at opposite sides of the active region A1, the disclosure is not limited thereto. The peripheral region A2 is, for example, a border region surrounding the active region A1. The active region A1 is, for example, a visible region, and the peripheral region A2 is, for example, an invisible region.

A sensing layer 120 is disposed on the substrate 110, and the sensing layer 120 includes a plurality of touch devices 122 and a plurality of conducting lines 124. In the present embodiment, the touch devices 122 and the conducting lines 124 may be formed in the same process and belong to the same film layer, where the touch devices 122 are located in the active region A1, and the conducting lines 124 are at least located in the peripheral region A2. Meanwhile, each of the touch devices 122 is electrically connected with the conducting lines 124.

The touch devices 122 are arranged along a first direction D1 and respectively extend along a second direction D2. The second direction D2 intersects with the first direction D1, and the second direction D2 and the first direction D1 are, for example, perpendicular to each other, but the disclosure is not limited thereto.

In the present embodiment, the touch device 122 is a single-layer touch sensing structure and disposed on one side of the substrate 110. The touch device 122 includes a first electrode 122A and a plurality of second electrodes 122B. The first electrode 122A is structurally separated and insulated from the second electrodes 122B. The first electrode 122A is, for example, a receiving electrode, and the second electrodes 122B are, transmitting electrodes, but the disclosure is not limited thereto.

Referring to FIG. 3B, the first electrode 122A is, for example, a comb-shaped electrode and includes a first connection portion E1A and a plurality of first extending portions E1B respectively connected with the first connection portion E1A. The second electrode 122B is, for example, a comb-shaped electrode and includes a second connection portion E2A and a plurality of second extending portions E2B respectively connected with the second connection portion E2A. The first extending portions E1B and the second extending portions E2B are disposed between the first connection portion E1A and the second connection portion E2A, and the second extending portions E2B is located between two adjacent first extending portions E1B.

An end of the first connection portion E1A is connected with one of the conducting lines 124, and an end of the second connection portions E2A is connected with one of the conducting lines 124. The conducting line 124 connected with the end of the first connection portion E1A and the conducting lines 124 connected with the ends of the second connection portions E2A extend from one side of the active region A1 into the peripheral region A2, but the disclosure is not limited thereto. In another embodiment, the conducting lines 124 may also extend from the opposite sides of the active region A1 into the peripheral region A2. By using the aforementioned design, widths of at least two sides of the peripheral region A2 may be reduced, so as to achieve a design demand for a narrow border or even a non-border.

When the conducting lines 124 extend from one side of the active region A1 into the peripheral region A2, the conducting line 124 connected with a second electrode 22B which is further away from the side of the active region A1 has a longer length, and usually has a greater impedance value. In the present embodiment, the conducting lines 124 located in the peripheral region A2 may facilitate in reducing impedance difference between different conducting lines 124 by a winding design, which contributes the sensing device 100 in having better device performance.

The sensing layer 120 may further include dummy electrodes 126 disposed in a region other than the region of the touch devices 122 and the region of the conducting lines 124 to compensate visual difference caused by disposition and none disposition of the aforementioned objects, so as to enhance uniformity and reduce object visibility.

The dummy electrodes 126 may include at least one first dummy electrode 126A, at least one second dummy electrode 126B and at least one third dummy electrode 126C. The first dummy electrodes 126A are disposed in the active region A1, where the first dummy electrodes 126A may be disposed between adjacent first extending portion E1B and second extending portion E2B, or between adjacent first connection portion E1A and second connection portion E2A. The first dummy electrodes 126A are structurally separated from the first connection portions E1A, the first extending portions E1B, the second connection portions E2A and the second extending portions E2B. The second dummy electrodes 126B are disposed between adjacent first extending portions E1B and between adjacent second electrodes 122B, and the second dummy electrodes 126B may extend from the active region A1 into the peripheral region A2. The third dummy electrodes 126C are located in the peripheral region A2, and at least a portion of the third dummy electrodes 126C are respectively disposed between two adjacent conducting lines 124.

In the present embodiment, the sensing device 100 may further include a cover CL and an adhesive layer AD. The cover CL is disposed at a side of the substrate 110 and bonded to the sensing layer 120 through the adhesive layer AD to provide the sensing layer 120 with adaptive protection. The cover CL may be a thin film made of a flexible plastic material with high tenacity or a flexible thin glass substrate. Alternatively, the cover CL may be a rigid substrate with high mechanical strength to protect (e.g., scratch-proofing) devices covered thereby. When both the cover CL and the substrate 110 are flexible, the sensing device 100 has flexibility, and a flexible radius thereof may be, for example, less than 100 mm. A starting side of the flexible radius is an operation surface of the sensing device 100. In the present embodiment, the operation surface is an outer surface S1 of the cover CL.

In the present embodiment, the sensing device 100 may further include a decoration layer BM. The decoration layer BM is disposed on the cover CL. The decoration layer BM may shield the peripheral region A2 and expose the active region A1. When the cover CL is bonded to the sensing layer 120, if a process deviation occurs, an opening O of the decoration layer BM for exposing the active region A1 may not be aligned with the active region A1, such that part of the conducting lines 124 which are located in the peripheral region A2 are exposed. By disposing the third dummy electrodes 126C in the peripheral region A2 other than the region where the conducting lines 124 are disposed, the visual difference caused by disposition and none disposition of the conducting lines 124 in the peripheral region A2 may be compensated.

In other words, in a scenario that the opening O is not aligned with the active region A1, the disposition of the third dummy electrodes 126C may facilitate in reducing the visibility of the conducting lines 124.

In order to clearly distinguish the first electrode 122A, the second electrodes 122B and the dummy electrodes 126, the first electrode 122A, the second electrodes 122B and the dummy electrodes 126 are illustrated by using different shading colors in FIG. 3B. The first electrode 122A, the second electrodes 122B and the dummy electrodes 126 may belong to the same film layer (i.e., the sensing layer 120) and may be formed by the same process step.

The sensing layer 120 (which may include the touch devices 122, the conducting lines 124 and the dummy electrodes 126) is, for example, a grid pattern layer and has preferable light transmittance. The sensing layer 120 may include a plurality of mesh units MU, and the mesh units MU may be the same or different.

In the present embodiment, referring to FIG. 3C, the first electrodes 122A and the conducting lines 124 connected therewith include a plurality of first mesh units MU1, the second electrodes 122B and the conducting lines 124 connected therewith include a plurality of second mesh units MU2, and the dummy electrodes 126 include a plurality of third mesh units MU3. In order to clearly distinguish the first mesh units MU1, the second mesh units MU2 and the third mesh units MU3, the first mesh units MU1, the second mesh units MU2 and the third mesh units MU3 are respectively illustrated by using lines with different line widths LW1, LW2 and LW3 in FIG. 3C. The design parameters of the first mesh units MU1, the second mesh units MU2 and the third mesh units MU3, such as line widths (i.e., LW1, LW2 and LW3), line spaces (i.e., P1, P2 and P3) and shapes, may vary with different design requirements. The first mesh units MU1, the second mesh units MU2 and the third mesh units MU3 may be the mesh units MU illustrated in any one of FIG. 1A, FIG. 2A through FIG. 2K or the like. Additionally, the first mesh units MU1, the second mesh units MU2 and the third mesh units MU3 may be not only regular mesh units, but also irregular mesh units. In other words, the design parameters of the mesh units MU, such as the line widths, the line spaces and the shapes may vary with different design requirements. For example, the line widths LW1, LW2 and LW3 may be less than or equal to 10 µm, and the line spaces P1, P2 and P3 may respectively fall within a range from 0.1 mm to 1 mm.

In a scenario where solid electrodes and solid conducting lines (or mesh-shaped electrodes and solid conducting lines) are formed by printing, disconnection may easily occur in junctions of the electrodes and the conducting lines in case the width difference is large. In the disclosure, referring to FIG. 3B, the electrode (e.g., the first electrodes 122A and the second electrodes 122B) and the conducting line 124 connected therewith are composed by a plurality of mesh units, the mesh unit of the electrode is connected with the mesh unit of the conducting line 124 in the junction X of the electrode and the conducting line 124. Through the electrode and the conducting line 124 connected therewith including the mesh units with substantially similar line widths in the present embodiment, the disconnection issue due to the large width difference in junction may be avoided.

Figure 3D:
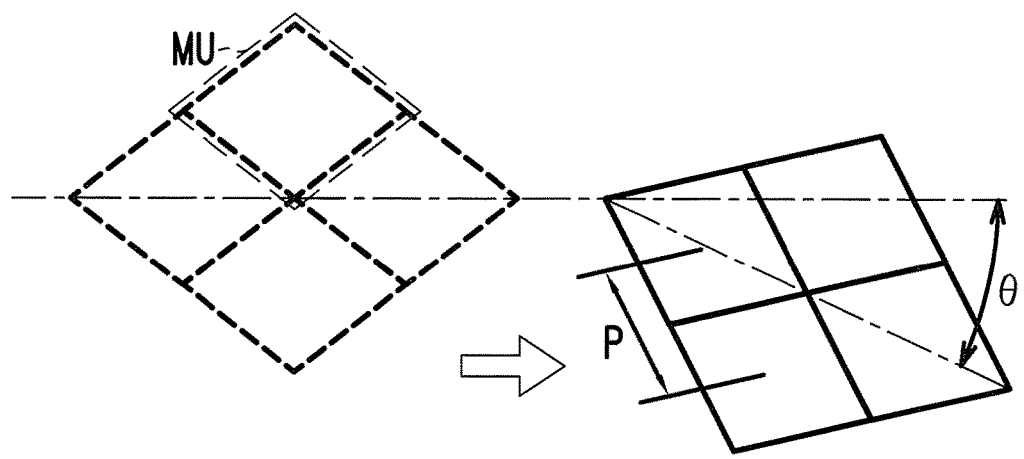
FIG. 3D illustrates the implementation of the mesh units depicted in FIG. 3C according to another embodiment.

FIG. 3D illustrates the implementation of the mesh units depicted in FIG. 3C according to another embodiment. With reference to FIG. 3D, the mesh units MU of the sensing device 100 and pixel arrays of the display panel respectively have arrangement periods, and thus, when the sensing device and the display panel overlap to form a touch display panel, optical moire patterns tend to easily appear in an area where the sensing device 100 and the display panel overlap to affect visual quality of the touch display panel. In the present embodiment, the mesh units MU may be rotated for an angle θ to avoid the occurrence of the optical moire patterns. However, the method of improving the optical moire patterns is not limited thereto. In another embodiment, the occurrence of the optical moire patterns may also be avoided by changing shapes and sizes (e.g., the line spaces $L_x$, $L_y$) of the mesh units MU.

Figure 4:
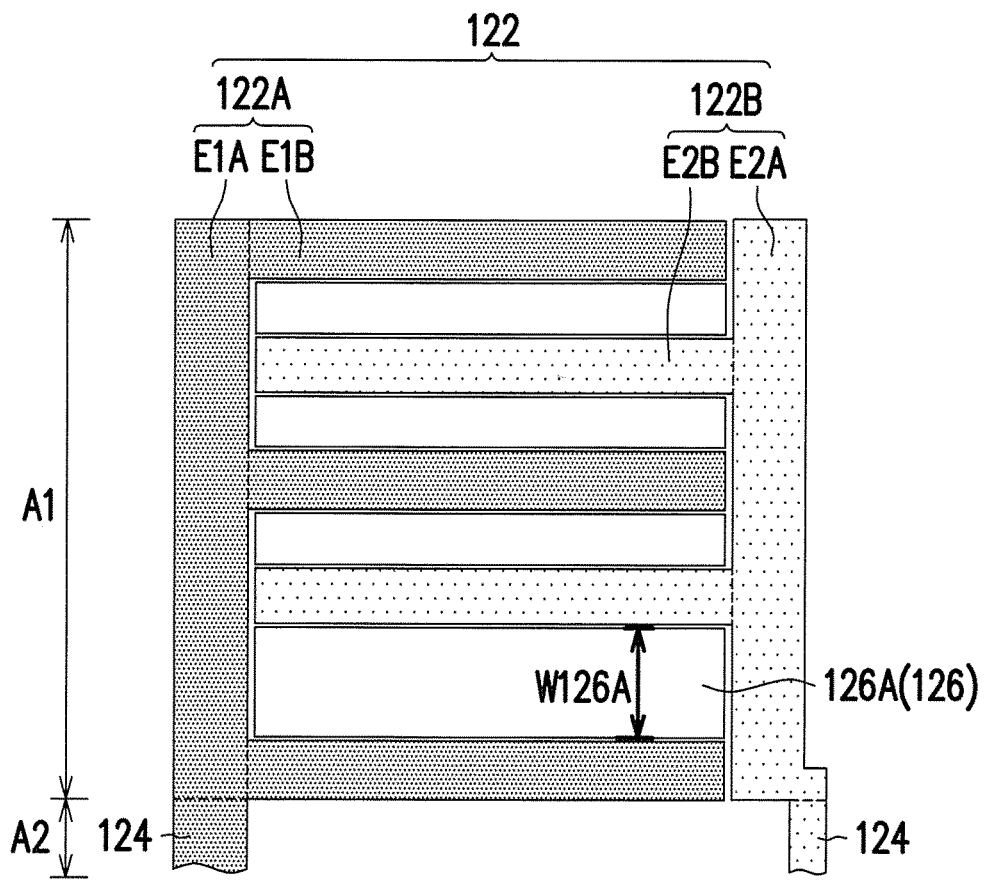
FIG. 4 is a partially schematic top-view diagram illustrating the sensing layer depicted in FIG. 3A according to another embodiment.

Furthermore, shapes and sizes of the touch devices 122, the conducting lines 124 and the dummy electrodes 126 may also be changed to meet different design requirements. FIG. 4 is a partially schematic top-view diagram illustrating the sensing layer depicted in FIG. 3A according to another embodiment. For instance, referring to FIG. 4, the first dummy electrodes 126A disposed between the adjacent first extending portions E1B and second extending portions E2B may have different widths W126A, and a method to change the width W126A of the first dummy electrode 126A may be changing the line space P3 of each third mesh unit MU3 (as shown in FIG. 3C) or changing the number of the third mesh units MU3 in a width direction (the width direction of the first dummy electrode 126A is parallel to the second direction D2 illustrated in FIG. 1B). In another embodiment, a width of the first extending portion E1B or a width of the second extending portion E2B may be changed according to different design requirements.

Figure 5:
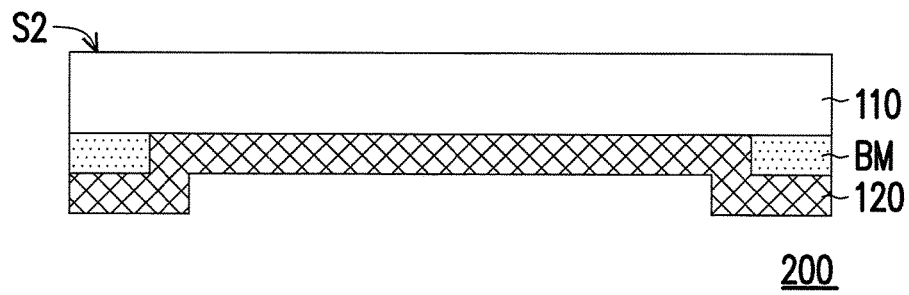
FIG. 5 is a cross-sectional-view diagram illustrating the sensing device according to an embodiment of the disclosure.

FIG. 5 is a cross-sectional-view diagram illustrating a sensing device according to an embodiment of the disclosure. Herein, the same components are labeled by using the same reference numerals and thus, will not be repeatedly described hereinafter. The substrate 110 of a sensing device 200 is a cover. The decoration layer BM may be further disposed on the substrate 110. In this structure, an outer surface S2 of the substrate 110 is an operating surface. In addition, the sensing layer 120 and the decoration layer BM are disposed on the substrate 110, and thus, the issue of the explosion of the conducting lines caused by bonding deviation as shown in FIG. 3A may be skipped from consideration, such that the third dummy electrode 126C depicted in FIG. 3B may be omitted.

Figure 6A:
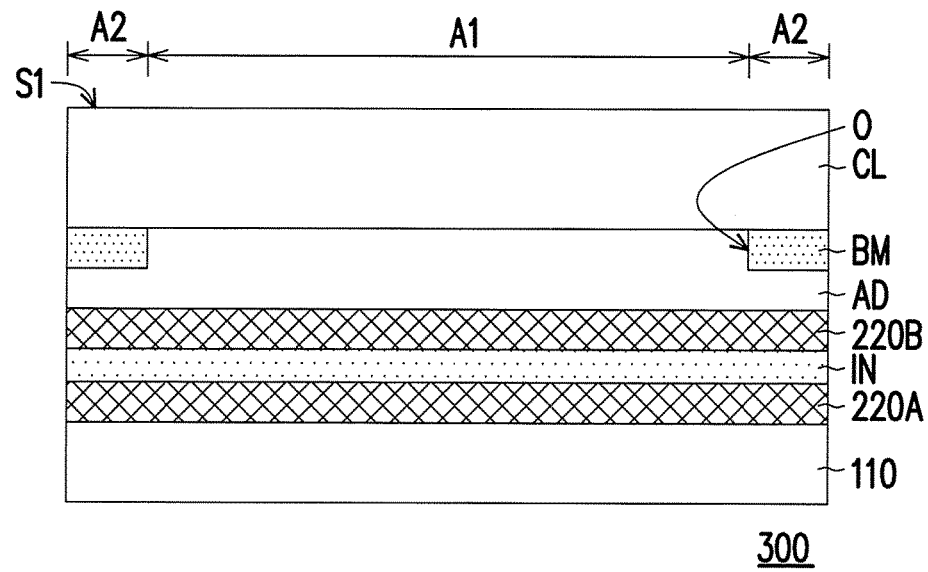
FIG. 6A is a cross-sectional-view diagram illustrating a sensing device according to an embodiment of the disclosure.
Figure 6B:
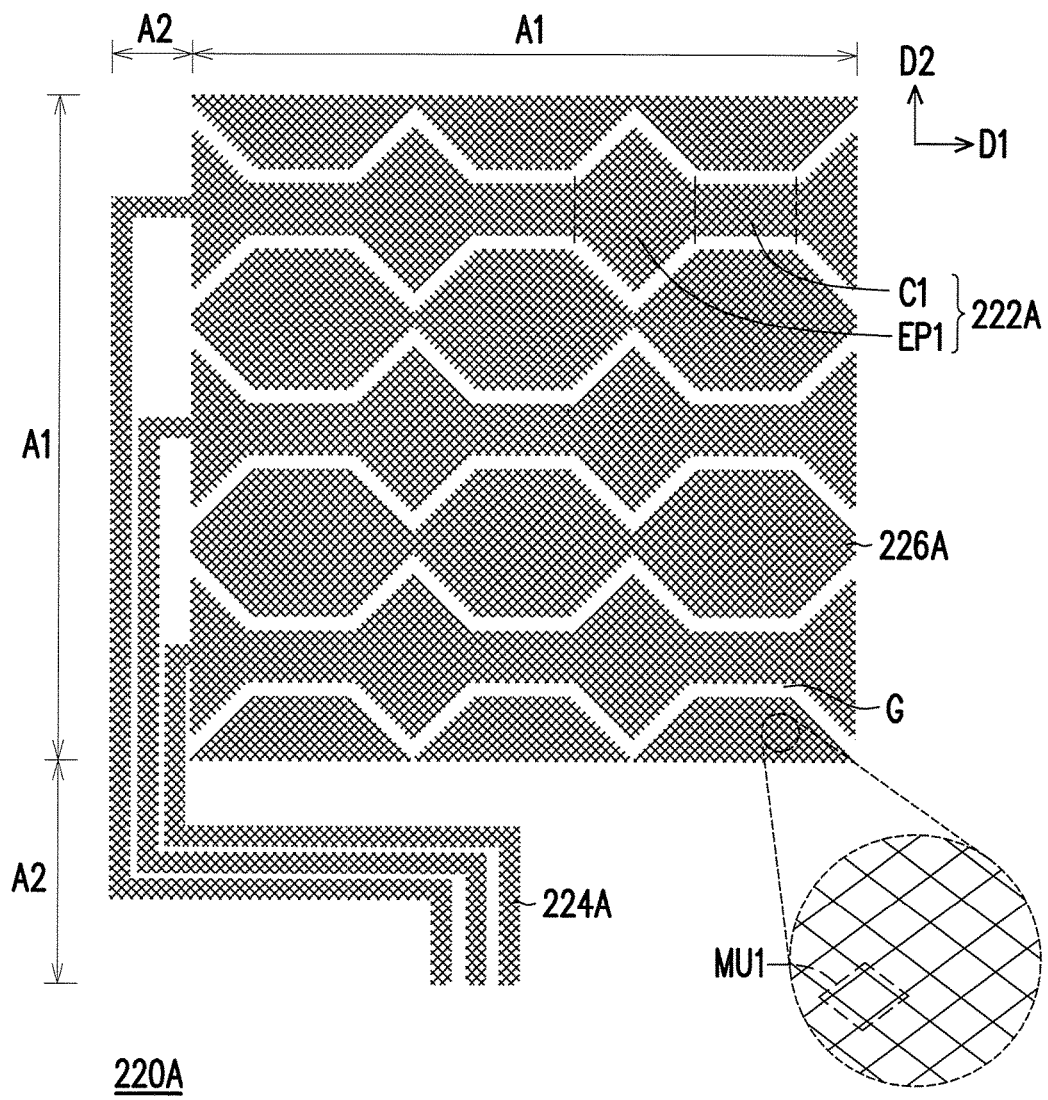
FIG. 6B is a schematic top-view diagram illustrating a first sensing layer depicted in FIG. 6A.
Figure 6C:
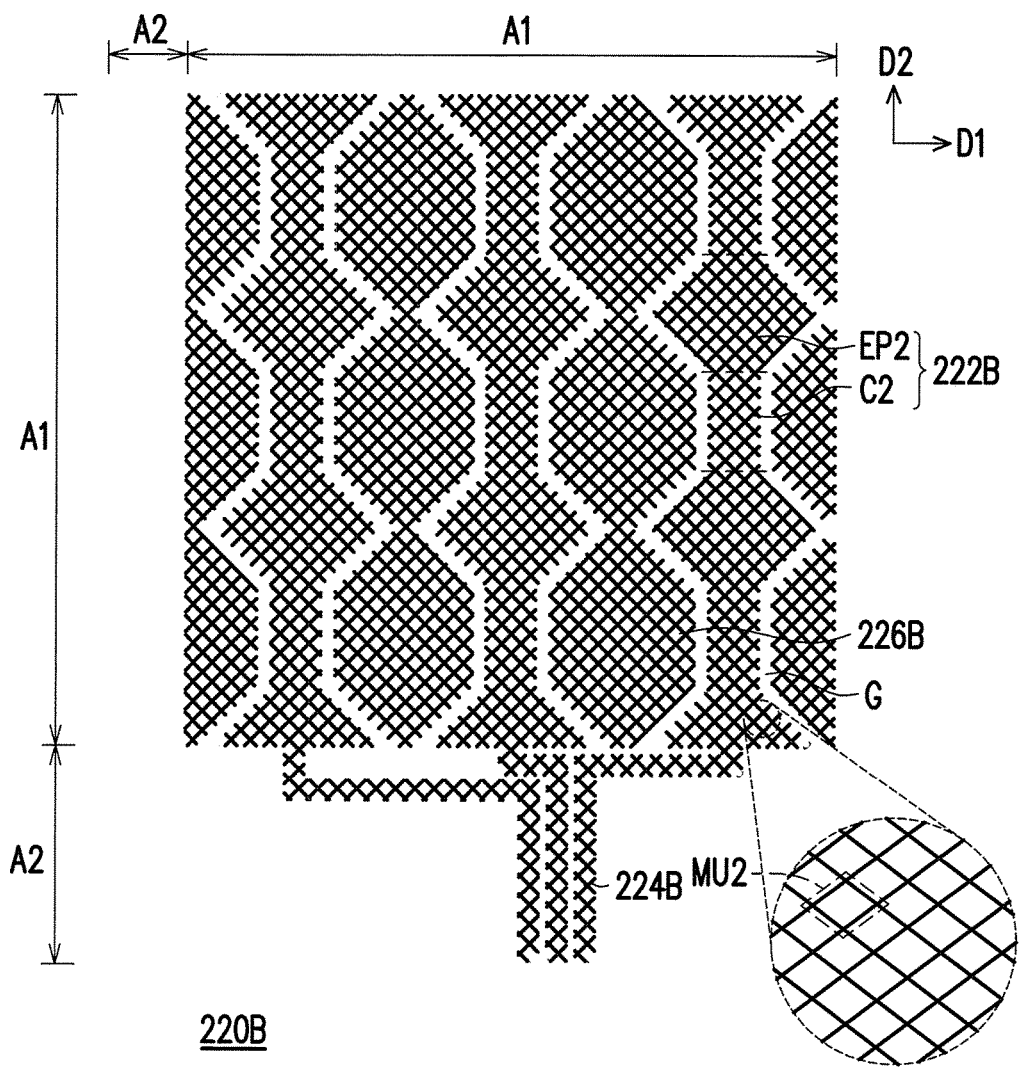
FIG. 6C is a schematic top-view diagram illustrating a second sensing layer depicted in FIG. 6A.
Figure 6D:
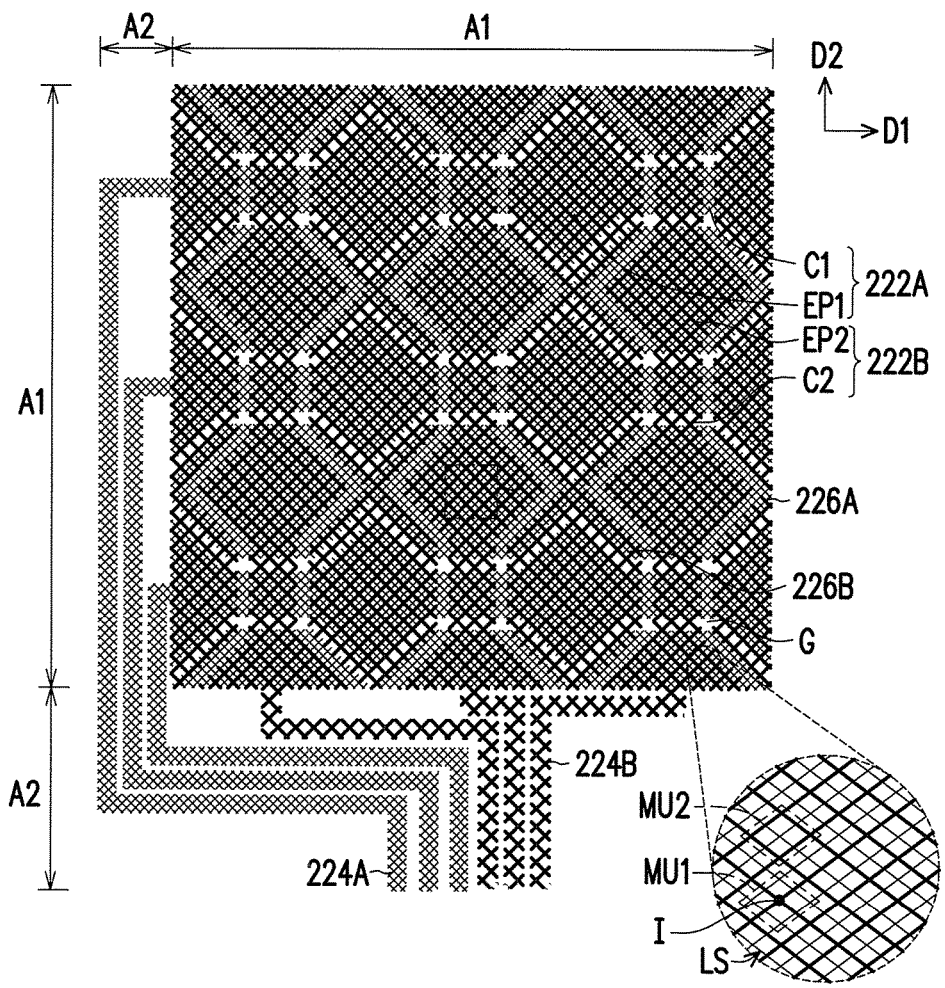
FIG. 6D is a schematic top-view diagram illustrating a sensing device according to an embodiment of the disclosure.

FIG. 6A is a cross-sectional-view diagram illustrating a sensing device according to an embodiment of the disclosure. FIG. 6B is a schematic top-view diagram illustrating a first sensing layer depicted in FIG. 6A. FIG. 6C is a schematic top-view diagram illustrating a second sensing layer depicted in FIG. 6A. FIG. 6D is a schematic top-view diagram illustrating a sensing device according to an embodiment of the disclosure. Herein, the same components are labeled by using the same reference numerals and thus, will not be repeatedly described. With reference to FIG. 6A through FIG. 6D, a sensing device 300 of the present embodiment has dual sensing layers formed by a first sensing layer 220A and a second sensing layer 220B. The first sensing layer 220A and the second sensing layer 220B are disposed, on one side of the substrate 110, but the disclosure is not limited thereto. Additionally, the sensing device 300 may further include an insulation layer IN disposed between the first sensing layer 220A and the second sensing layer 220B to structurally separate and insulate the first sensing layer 220A and the second sensing layer 220B from each other.

Referring to FIG. 6B, the first sensing layer 220A includes, for example, a plurality of first electrodes 222A, a plurality of conducting lines 224A and a plurality of first dummy electrodes 226A. The first electrodes 222A are located in the active region A1. The first electrodes 222A are arranged along the second direction D2 and respectively extend along the first direction D1. In the present embodiment, the first electrode 222A may include a plurality of first electrode pads EP1 and a plurality of first connection portions C1, and two adjacent first electrode pads EP1 are connected in series by the first connection portion C1 along the first direction D1. The conducting lines 224A are located in the peripheral region A2, and each of the conducting lines 224A is electrically connected with one of the first electrodes 222A. The first dummy electrodes 226A are located in the active region A1 and in an area other than where the first electrodes 222A are located. The first dummy electrode 226A may have a gap G from the first electrode 222A, to ensure that the first electrodes 222A may maintain independent electricity.

Referring to FIG. 6C, the second sensing layer 220B includes, for example, a plurality of second electrodes 222B, a plurality of conducting lines 224B and a plurality of second dummy electrode 226B. The second electrodes 222B are located on the active region A1. The second electrodes 222B are arranged along the first direction D1 and respectively extend along the second direction D2. In the present embodiment, the first direction D1 and the second direction D2 are not parallel, but perpendicular to each other, for example. The first direction D1 is, for example, the x-axial direction, and the second direction D2 is, for example, the y-axial direction, but the disclosure is not limited thereto. In the present embodiment, the second electrode 222B may include a plurality of second electrode pads EP2 and a plurality of second connection portions C2, and two adjacent second electrode pads EP2 are connected in series by the second connection portion C2 along the second direction D2. The conducting lines 224B are located in the peripheral region A2, and each of the conducting lines 224B is electrically connected with one of the second electrodes 222B. The second dummy electrodes 226B are located in the active region A1 and in an area other than where the second electrode 222B located. The second dummy electrode 226B may have the gap G from the second electrode 222B, to ensure that the second electrodes 222B may maintain independent electricity.

The first sensing layer 220A and the second sensing layer 220B may be grid pattern layers, respectively, and the first sensing layer 220A and the second sensing layer 220B may be formed by printing. For example, the first sensing layer 220A and the second sensing layer 220B may be formed on the substrate 110 by a gravure off-set printing process, but the disclosure is not limited thereto. It is to be specially mentioned that in the present embodiment, the conducting lines 224A and 224B are illustrated as also including mesh units for example, but the disclosure is not limited thereto. For instance, in an embodiment, the conducting lines 224A and 224B may be a single solid conducting line, and a line width thereof may be designed according to resistance requirement (e.g., a line width size less than 20 μm) to obtain a narrow border and to meet the requirement of sufficient resistance, and devices having different line widths, line thicknesses or resistance values may be manufactured by one printing process according to different design demands. In the present embodiment, a flexible substrate may be selected to serve as the substrate 110, and a flexible radius R of the sensing device 200 is, for example, less than 100 mm. Therefore, a roll-to-roll process may be performed to quickly manufacture in a large area according to demands, and the sensing device 200 may be applied in flexible electronic circuits and components.

The first sensing layer 220A includes a plurality of first mesh units MU1, and the second sensing layer 220B includes a plurality of second mesh units MU2. In order to distinguish the first mesh units MU1 and the second mesh units MU2, the first mesh units MU1 and the second mesh units MU2 are illustrated by using lines with different widths in FIG. 6B, FIG. 6C and FIG. 6D. The first mesh units MU1 may be identical to the second mesh units MU2. Alternatively, the first mesh units MU1 and the second mesh units MU2 may be different in having at least one of different widths, different line spaces and different shapes. The first mesh units MU1 and the second mesh units MU2 may be the mesh units MU illustrated in one of FIG. 1A, FIG. 2A through FIG. 2K or the like.

With reference to FIG. 6D, in the present embodiment, the sensing device 300 may adopt a dual-layer touch sensing structure, in which the first electrodes 222A and the second electrodes 222B may be alternately arranged and maintain independent electricity by the insulation layer IN illustrated in FIG. 6A. The first electrodes 222A may be, for example, transmitting electrodes, and the second electrode 222B may be, for example, receiving electrodes, but the disclosure is not limited thereto.

The active region A1 of the sensing device 300 may be formed by stacking two grid pattern layers. In this structure, referring to FIG. 6D, the first mesh units MU1 and the second mesh units MU2 may be alternately arranged. An intersection I of adjacent grid lines LS of the second mesh unit MU2 may fall within one of the first mesh units MU1, for example, and the intersection I may be located in the center of the one of the first mesh units MU1, for example, but the disclosure is not limited thereto.

In an embodiment, the active region A1 may be divided into two or more areas, and the areas may be designed as having different grid patterns according to demands. For instance, a first area may include the grid pattern illustrated in one of FIG. 1A, FIG. 2A through FIG. 2K, and a second area may include the grid pattern illustrated in another one of FIG. 1A, FIG. 2A through FIG. 2K, so on likewise. The first area and the second area may be two areas arranged vertically or horizontally, two areas divided by a diagonal, or two areas divided by any other manner. In another example, in case the active region A1 is divided into four areas, the four areas may be arbitrary four areas divided by two cross lines.

Figure 7:
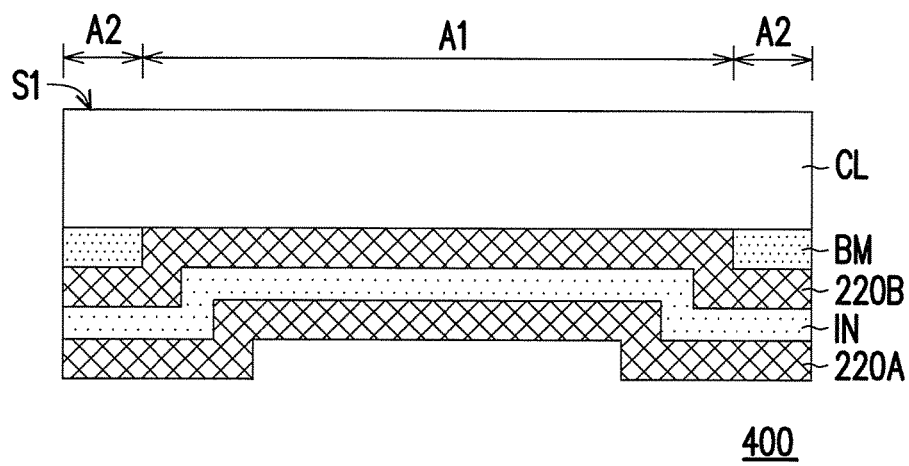
FIG. 7 through FIG. 10 are schematic cross-sectional-view diagrams illustrating sensing devices according to other embodiments of the disclosure.

FIG. 7 through FIG. 10 are schematic cross-sectional-view diagrams illustrating sensing devices according to other embodiments of the disclosure. With reference to FIG. 7, in a sensing device 400 of the present embodiment, the same components as those in the sensing device 200 are labeled by using the same reference numerals and thus, will not be repeatedly described hereinafter. The sensing device 400 uses a structure like the dual-layer touch sensing structure in FIG. 6A.

Figure 8:
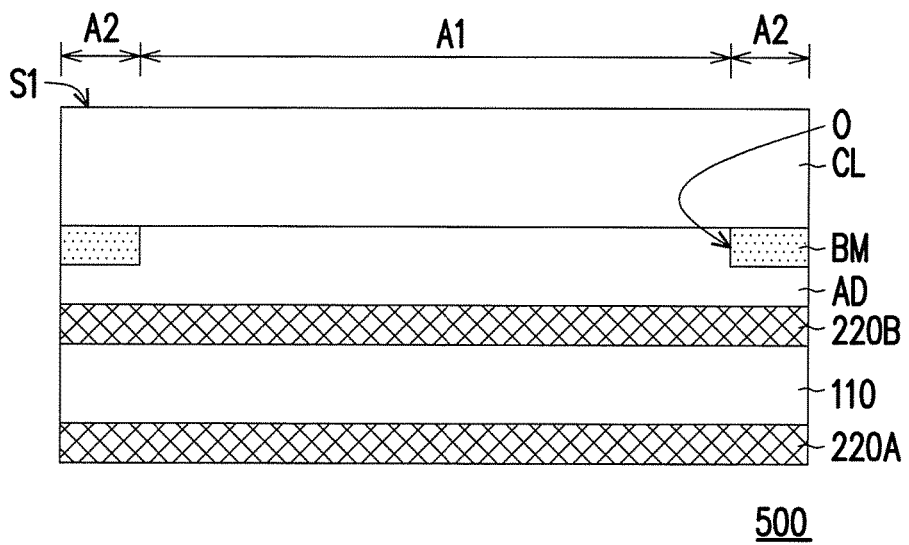

With reference to FIG. 8, in a sensing device sensing device 500 of the present embodiment, the same components as those in the sensing device 300 are labeled by using the same reference numerals and thus, will not be repeatedly described hereinafter. The first sensing layer 220A and the second sensing layer 220B of the sensing device 500 are respectively disposed on opposite sides of the substrate 110. Thereby, the insulation layer IN of the sensing device 300 may be omitted in the sensing device 500.

Figure 9:
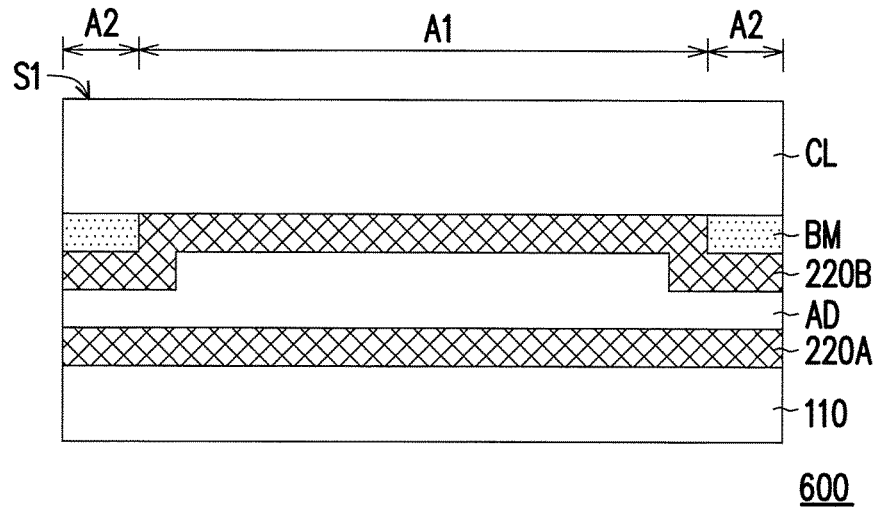

With reference to FIG. 9, in a sensing device 600 of the present embodiment, the same components as those in the sensing device 300 are labeled by using the same reference numerals and thus, will not be repeatedly described hereinafter. The second sensing layer 220B of the sensing device 600 is disposed on the cover CL, the first sensing layer 220A of the sensing device 600 is disposed on the substrate 110, and the second sensing layer 220B is structurally separated from the first sensing layer 220A through the adhesive layer AD. The insulation layer IN of the sensing device 300 may be omitted in the sensing device 600. In the present embodiment, the adhesive layer AD may be, for example, a mesh adhesive layer disposed on a position where the second mesh units MU2 of the second sensing layer 220B overlap the first mesh units MU1 of the first sensing layer 220A.

Figure 10:
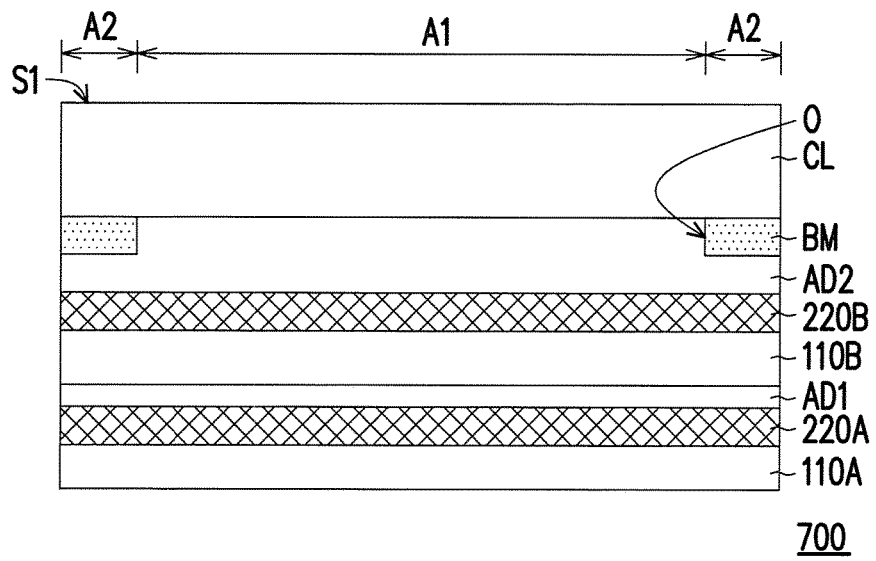

With reference to FIG. 10, in a sensing device 700 of the present embodiment, the same components as those in the sensing device 300 are labeled by using the same reference numerals and thus, will not be repeatedly described hereinafter. The sensing device 700 includes a first substrate 110A, a second substrate 110B, a first adhesive layer AD1 and a second adhesive layer AD2. The first sensing layer 220A is disposed on the first substrate 110A, and the second sensing layer 220B is disposed on the second substrate 110B. The second substrate 110B is disposed between the first substrate 110A and the cover CL. The first substrate 110A may be bonded to the second substrate 110B through the first adhesive layer AD1, and the second substrate 110B may be bonded to the cover CL through the second adhesive layer AD2. In the present embodiment, the insulation layer IN of the sensing device 300 may be omitted in the sensing device 700.

An aperture ratio of the sensing devices 100, 200, 300, 400, 500, 600 and 700 of embodiments described above may fall within a range from 83% to 96%.

A display panel generally includes regularly arranged structures, such as black matrices or pixel arrays, and thus, when the mesh touch electrode layer which is also regularly arranged overlaps the display panel to form a touch device, optical moire patterns may be occurred by the regularly arranged structures in the display panel and the mesh touch electrode layers, which leads display quality of the display panel to be affected. In the embodiments above, the mesh touch electrode layers with randomly varied line widths and/or line spaces of one of the embodiments of the disclosure are adopted in the touch device, such that the mesh touch electrode layer has irregularly and randomly arranged grid patterns. The occurrence of the optical moire patterns may be reduced, so as to increase the display quality of the display panel.

Figure 11A:
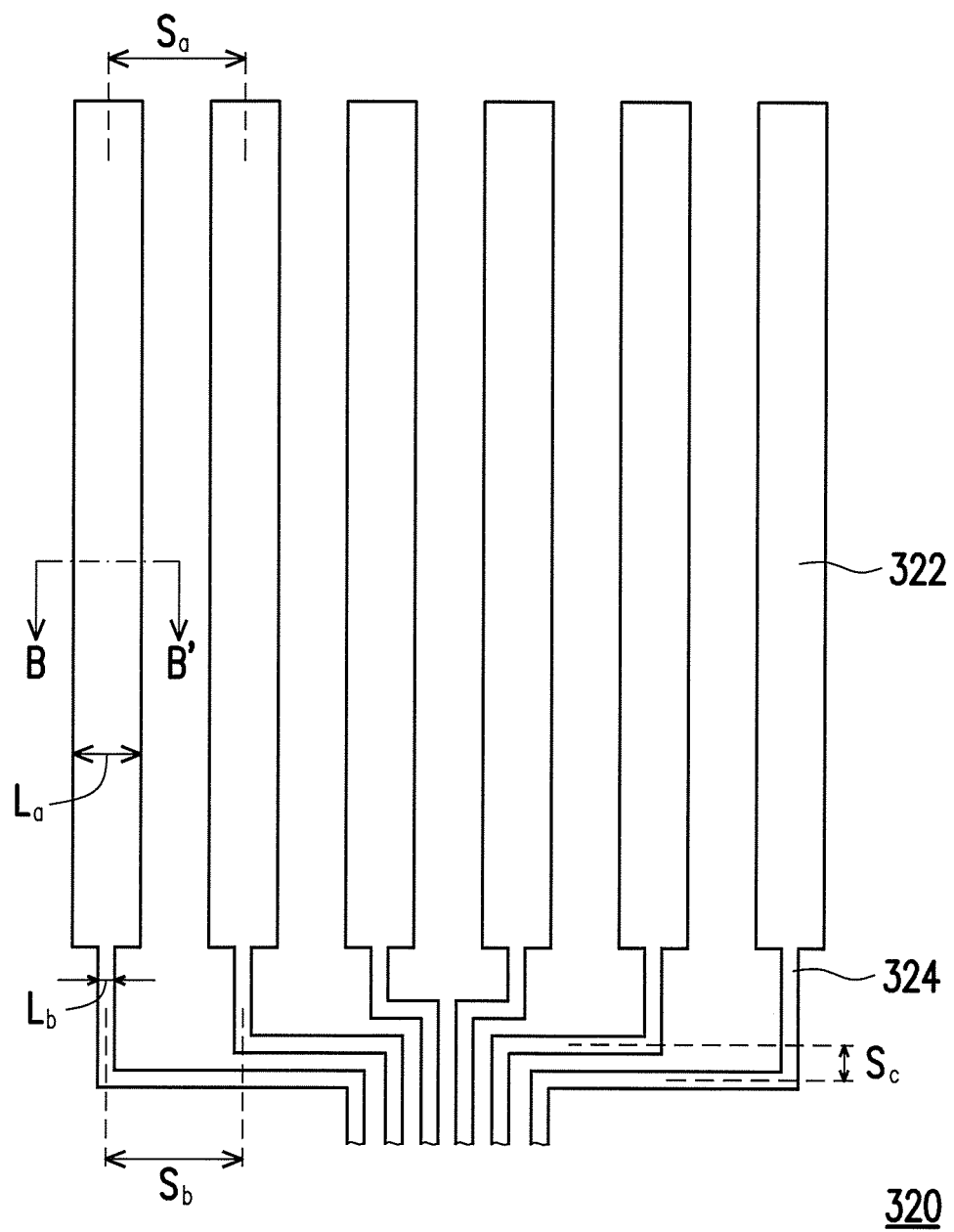
FIG. 11A is a schematic diagram illustrating an electrode layer according to an embodiment of the disclosure.
Figure 11B:
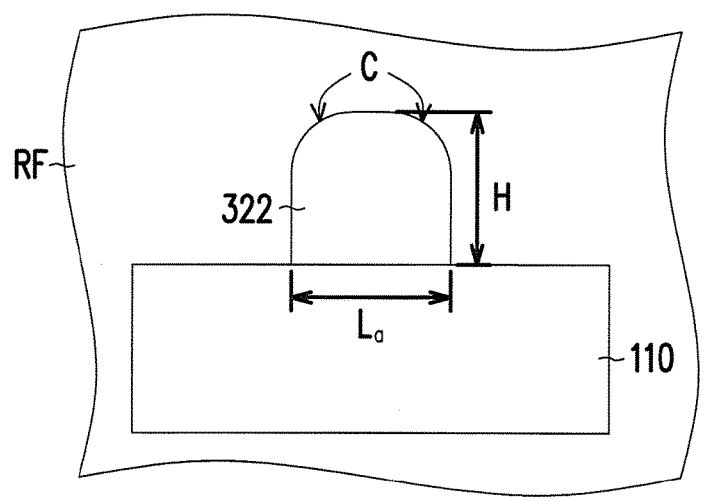
FIG. 11B is a schematic cross-sectional-view diagram along the cross-section line B-B' in FIG. 11A.

FIG. 11A is a schematic diagram illustrating an electrode layer according to an embodiment of the disclosure, and FIG. 11B is a schematic cross-sectional-view diagram along the cross-section line B-B' in FIG. 11A. With reference to FIG. 11A and FIG. 11B, an electrode layer 320 has a plurality of conducting lines 322 and 324, the conducting lines 322 and 324 have line widths $L_a$ and $L_b$ and line spaces $S_a$, $S_b$ and $S_c$. The conducting lines 322 and 324 have at least three line widths $L_a$, $L_b$ or at least three line spaces $S_a$, $S_b$, $S_c$, and an appearing probability of each of the line widths $L_a$ and $L_b$ is substantially the same in the electrode layer 320 or an appearing probability of each of the line spaces $S_a$, $S_b$ and $S_c$ is substantially the same in the electrode layer 320. In the present embodiment, the line widths $L_a$ and $L_b$ range, for example, from 3 to 30 μm, and the line spaces $S_a$, $S_b$ and $S_c$ range, for example, from 50 to 200 μm, but the disclosure is not limited thereto. In the present embodiment, ratios of the line widths $L_a$ and $L_b$ to the line spaces $S_a$, $S_b$ and $S_c$ of the conducting lines 322 and 324 may range from 1/200 to 1/2. An aperture ratio of the electrode layer 320 may range from 83% to 96%. Referring to FIG. 11B, at least one of the conducting lines 322 and 324 has a bottom surface and a cross-section, the cross-section is perpendicular to the bottom surface and has at least one curved portion C. The curved portion C is, for example, arcuate or has a continuously changed slope. Even though the cross-sectional view of the conducting lines 322 is illustrated in the present embodiment for example, it should be noted that the conducting lines 324 may have the similar cross-sectional view of the conducting lines 322 and thus, will not repeatedly described. The curved portion C may have the same structural shape as illustrated in FIG. 1C and FIG. 1D. The curved portion C may refer to the description above and thus, will not be repeatedly described. In the present embodiment, the electrode layer 320 is disposed, for example, on the substrate 110. A method of forming the electrode layer 320 is, for example, a printing process. A material of the electrode layer 320 may be a transparent conductive material, which may include, for example, metal oxides, conductive/conjugate polymers, carbon nanotubes, graphene, silicene, and metal nanowires such as silver nanowires or any other transparent conductive material. The metal oxides may include, for example, ITO, IZO, ATO, AZO, IGZO, FTO or other metal oxides. A material of the substrate 110 may refer to the descriptions above and will not be repeatedly described hereinafter.

Figure 12:
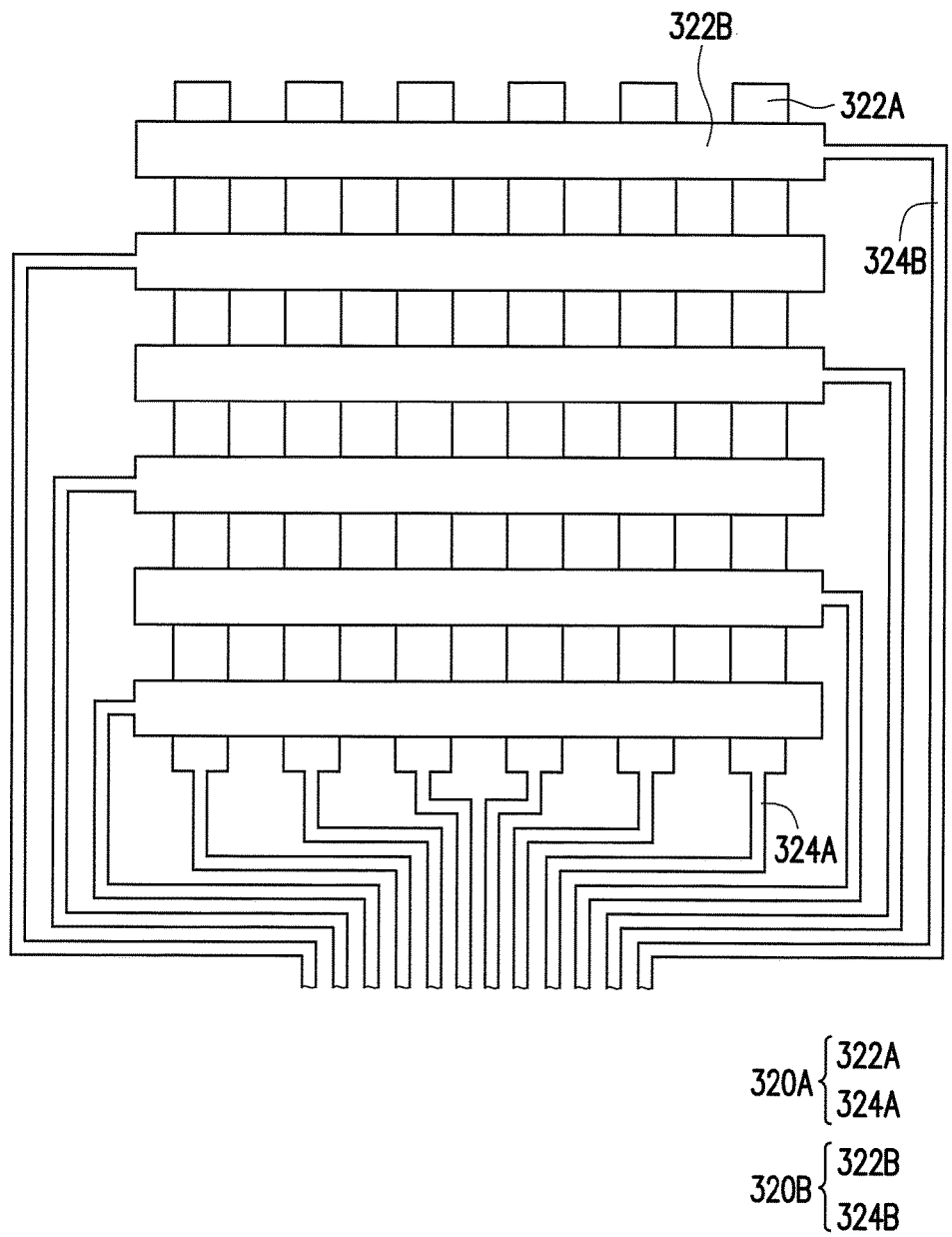
FIG. 12 is a schematic top-view diagram illustrating a sensing device according to an embodiment of the disclosure.

In the present embodiment, the electrode layer 320 may serve as a sensing layer, in which the conducting lines 322 may serve as, for example, transmitting electrodes or sensing electrodes, and the conducting lines 324 thereof may serve as, for example, the conducting lines for connecting the conducting lines 322. For instance, referring to FIG. 12, a first electrode layer 320A serves as a first sensing layer, in which conducting lines 322A serve as, for example, transmitting electrodes, and conducting lines 324A serve as, for example, peripheral conducting lines, and a second electrode layer 320B serves as for example, a second sensing layer, in which conducting lines 322B serve as, for example, receiving electrodes, and conducting lines 324B serve as, for example, peripheral conducting lines. In this way, the first electrode layer 320A and the second electrode layer 320B may be applied in the sensing devices illustrated in FIG. 6A, FIG. 7 through FIG. 10. Certainly, the electrode layer 320 may also be applied in devices other than the sensing device, which is not limited in the disclosure. Moreover, even though each of the conducting lines 322, 322A and 322B is illustrated as having the same line width $L_a$ and the same line space $S_a$ in the preceding embodiment for example, the disclosure is not limited thereto. Namely, the conducting lines 322, 322A and 322B may have variations in the line widths and the line spaces. Similarly, the conducting lines 324, 324A and 324B may also have variations in the line widths and line spaces.

In the present embodiment, the electrode layers 320, first electrode layer 320A and second electrode layer 320B have characteristics, such as high transmittance, low resistance and flexibility and have flexible radiuses less than 100 mm and thus, may be applied to devices, such as display devices, sensing devices, foldable devices and so on. Furthermore, according to different designs, conducting lines 322, 322A, 322B and the conducting lines 324, 324A and 324B with different line widths, line thicknesses or resistance values may be manufactured by one printing process. Namely, the electrode layers 320, first electrode layer 320A and second electrode layer 320B have a simple manufacturing method.

Even though the mesh electrode and the electrode layers are illustrated as being applied in the sensing device in the embodiments above for example, the disclosure is not limited thereto. In other words, the mesh electrode and the electrode layers may also be applied in other devices.

In an embodiment of the disclosure, the grid lines of the mesh electrode has randomly changed line widths and/or line spaces, and thus, the mesh electrode is substantially formed by grid patterns with randomly changed sizes. In other words, the mesh electrode has irregularly and randomly arranged grid patterns. When the mesh electrode is applied to a sensing device (e.g., a touch panel), the optical moire patterns caused by regularly arranged structures, such as black matrices or pixel arrays in the sensing device and the mesh electrode may be avoided, so as to improve the display quality of the sensing device. Furthermore, in an embodiment of the disclosure, the line widths and the line spaces in the electrode layer may be adjusted according to different designs, and the electrodes and the conducting lines having required line widths and line spaces may be printed in one printing process.

In an embodiment of the disclosure, the mesh electrode and the electrode layers which may be manufactured by using the printing process therefore have simple steps, low equipment cost and being capable of manufacturing in a large area. The mesh electrode formed by the grid patterns may have characteristics, such as having good transmittance, low resistance, good film uniformity and being capable of adjusting printing patterns according to different designs. Also, a roll-to-roll process may be performed to quickly manufacture in a large area according to demands, and the sensing device can be applied in flexible electronic circuits and components.

It will be clear that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A sensing device, comprising: a first substrate; a first sensing layer, disposed on the first substrate and comprising a plurality of first mesh units formed by a plurality of grid lines intersecting and connected with each other, wherein at least one of the grid lines has a bottom surface and a cross-section, and the cross-section is perpendicular to the bottom surface and has at least one curved portion; a second sensing layer stacked with the first sensing layer, wherein the second sensing layer comprises a plurality of third mesh units, and the third mesh units are formed by a plurality of grid lines intersecting and connected with each other; and wherein the first sensing layer and the second sensing layer are disposed on opposite sides of the first substrate.

2. The sensing device according to claim 1, wherein the grid lines have at least three line widths or at least three spaces, and an appearing probability of each line width is substantially the same in the mesh electrode, or an appearing probability of each line space is substantially the same in the mesh electrode.

3. The sensing device according to claim 1, wherein the first mesh units form a plurality of first electrodes.

4. The sensing device according to claim 3, further comprising a plurality of dummy electrodes forming by a plurality of second mesh units and disposed between the first electrodes.

5. The sensing device according to claim 3, further comprising a plurality of first conducting lines electrically connected with first electrodes respectively.

6. The sensing device according to claim 1, further comprising a second substrate, wherein the second sensing layer is disposed on the second substrate.

7. The sensing device according to claim 6, further comprising an adhesive layer disposed on a position where the first sensing layer and the second sensing layer overlap.

8. The sensing device according to claim 1, wherein the first sensing layer has flexibility.

9. The sensing device according to claim 8, wherein a flexible radius of the first sensing layer is less than 100 mm.

10. The sensing device according to claim 1, wherein a material of the grid lines comprises metal oxides, conductive polymers, conjugate polymers, carbon nanotubes, graphene, silicene, metal nanowires, conductive inks, metal, complex metal compounds or a combination thereof.

11. The sensing device according to claim 1, wherein the line widths of the grid lines ranges from 3 to 30 μm.

12. The sensing device according to claim 1, wherein ratios of the line widths to the line spaces of the grid lines range from 1/200 to 1/2.

13. The sensing device according to claim 1, having an aperture ratio ranging from 83% to 96%.

14. The sensing device according to claim 1, wherein the curved portion is arcuate or has a continuously changed slope.

* * * * *